(12) United States Patent
Withers et al.

(10) Patent No.: US 6,723,279 B1
(45) Date of Patent: Apr. 20, 2004

(54) GOLF CLUB AND OTHER STRUCTURES, AND NOVEL METHODS FOR MAKING SUCH STRUCTURES

(75) Inventors: James C. Withers, Tucson, AZ (US); Raouf O. Loutfy, Tucson, AZ (US); Sion M. Pickard, Tuscon, AZ (US); Kenneth J. Newell, Tucson, AZ (US); William B. Kelly, Tucson, AZ (US)

(73) Assignee: Materials and Electrochemical Research (MER) Corporation, Tuscon, AZ (US)

( * ) Notice: Subject to any disclaimer, the term of this patent is extended or adjusted under 35 U.S.C. 154(b) by 0 days.

(21) Appl. No.: 09/268,251

(22) Filed: Mar. 15, 1999

(51) Int. Cl.$^7$ .................................................. B22F 3/26
(52) U.S. Cl. .............................. 419/27; 419/12; 419/14
(58) Field of Search ............................. 419/10, 12, 14, 419/27

(56) References Cited

U.S. PATENT DOCUMENTS

| | | | |
|---|---|---|---|
| 4,828,008 A | | 5/1989 | White et al. |
| 4,838,474 A | | 6/1989 | Ohashi et al. |
| 5,037,102 A | * | 8/1991 | Fukayama et al. ....... 273/167 J |
| 5,045,400 A | | 9/1991 | Esashi |
| 5,280,819 A | * | 1/1994 | Newkirk et al. ............... 164/98 |
| 5,340,107 A | * | 8/1994 | Baker et al. ............ 273/167 R |
| 5,342,812 A | * | 8/1994 | Niskanen et al. ........... 501/127 |
| 5,529,108 A | * | 6/1996 | Newkirk et al. ............... 164/97 |
| 5,585,190 A | | 12/1996 | Newkirk et al. |
| 5,715,887 A | * | 2/1998 | Hosokawa .................... 164/97 |
| 6,296,045 B1 | * | 10/2001 | Fox et al. ..................... 164/98 |
| 6,319,437 B1 | * | 11/2001 | Elsner et al. ................. 264/44 |

* cited by examiner

Primary Examiner—Daniel J. Jenkins
(74) Attorney, Agent, or Firm—Jerome M. Teplitz

(57) ABSTRACT

Golf club structures, including club heads and shafts, composed of composites comprised of a matrix of metal, such as an aluminum alloy, or a plastic material and a fiber such as graphite or a ceramic, which may be whiskerized, and which may also be selectively weighted as in the toe and heel of a club head, with heavy particles such as tungsten metal. The club structure may also be surface hardened by applying a coating of fullerenes to a metal club structure and heat treating it to produce a hard coating of metal carbide, preferably by coating a titanium golf club structure with fullerenes and heat treating the coated structure to produce a titanium carbide surface.

58 Claims, 7 Drawing Sheets

GOLF CLUB AND OTHER STRUCTURES, AND NOVEL METHODS FOR MAKING SUCH STRUCTURES

BACKGROUND OF THE INVENTION

The present invention relates to improvements in the composition and manufacture of golf club heads and golf club shafts, both of which are composed of composites comprised of a metal or plastic matrix and a fiber such as graphite or a ceramic, which may be whiskerized, and which may be selectively weighted with tungsten particles and the like and may also be surface hardened using fullerenes to apply a hard coating such as titanium carbide

DESCRIPTION OF THE PRIOR ART

Heretofore golf club head materials have consisted of woods, including persimmon, laminates of various woods and woods filled with resins, etc; metals of aluminum, stainless steel, brass, bronze, titanium, various alloys of these and other metals; graphite fiber reinforced plastics of various kinds; and ceramic particle or whisker reinforced metals containing up to 50 volume percent ceramic phases such as described in U.S. Pat. No. 5,037,102 in which the metal is aluminum with a variety of ceramic particles.

The golf club shaft heretofore has consisted of monolithic metal alloy tubes such as carbon steel, stainless steels, high alloyed steels, titanium and aluminum alloys and plastic matrix composites reinforced with graphite fiber, boron fiber and various metal wires such as titanium.

An ideal golf club material is lightweight, high strength, high hardness; good wear resistance, good impact strength or toughness and high modulus or resistance to bending. The shaft, and especially composite shafts, should have high shear strength and torsional modulus, which is high resistance to torquing or twisting. Present materials do not process the ideal blend of these desired properties. For example, up to 50 v/o ceramic particle reinforced aluminum does not process as high modulus, hardness and wear resistance as desired and that can be achieved with a higher ceramic particle content.

Graphite fiber reinforced plastics lack hardness and wear resistance. Graphite fiber reinforced resin shafts without or with boron fibers lack high torsional modulus as well as abrasion resistance.

The present invention cures the above-described deficiencies of golf club heads and shafts heretofore in use. The present invention can also be utilized to improve the performance of existing golf clubs through the utilization of many of the materials as an integral part of the existing clubs that includes the category of "irons".

OBJECTS AND ADVANTAGES OF PRESENT INVENTION

It is an object of the present invention to provide novel and improved golf club structures that overcome the above-described deficiencies of prior art golf club heads and shafts and to provide novel methods of producing such structures.

It is a further object of the present invention to provide novel methods and structures for improving the performance of existing golf clubs, including both irons and woods as well as shafts.

It is a still further object of this invention to provide novel methods for making improved golf club structures, characterized by relatively light weight while providing high strength and hardness, enabling the construction of larger club heads with selective weighting in various sections of the club that can provide unique performance advantages.

SUMMARY OF THE INVENTION

One aspect of the present invention provides improved golf club structures comprising one or more of fiber reinforced metals; ceramic particle or whisker reinforced metal matrices, tubular reinforcements, graphite or ceramic fibers with whiskers growing off the fiber as reinforcement for the golf club.

Another aspect of the invention provides improved golf club structures comprising one or more of the following: a carbon matrix with graphite or ceramic reinforcement in particle or fiber form, a graphite or ceramic reinforcement in particle or fiber form with a plastic matrix containing a select elemental or compound additive that forms a carbide or other hard matrix plus when the matrix is pyrolyzed (carbonized).

Another aspect of the invention provides improved golf club structures comprising one or more of the following: hybride composite containing more than one reinforcement type, such as fiber and particles, and matrix, such as carbon and metal, ceramic or plastic.

A further aspect of the invention provides improved golf club structure comprising of multilaminate composites which comprise adjacent layers of materials such as metal-metal, metal-plastic, metal-wood, metal-ceramic, or metal-composite or which may comprise alternate combinations of layers of: plastic composite-ceramic, composite-composite, metal-ceramic-plastic, composite-wood-ceramic, or metal-metal-composite.

A still further aspect of the invention provides improved golf club and other structures embodying a coating containing carbon in the form of fullerenes ("buckyballs"), such as $C_{60}$, and higher homologs that functions as a bonding layer along with composite compositions with metals or plastics or when heat treated forms a carbide surface which is harder than the original metal.

A still further aspect of the invention is achieving enhanced performance through the size and concentration of the constituent components of particle size, fiber size or laminate thickness including combinations thereof.

A still further aspect of the invention is the concurrence of two materials integral to each other including ceramic-metal, metal-metal, plastic-ceramic, plastic-metal, metal-composite, plastic-composite and combinations thereof.

A still further aspect of the invention is the provision of novel methods for making golf club structures involving the infiltration of a matrix material such as a metal into a porous array of another material such as ceramic particles or fibers and/or heavy metal particles such as tungsten to achieve special properties such as hardness and weight and/or controlling the weight of the club in specific areas to influence the center of gravity, or expand or lower the "sweet" spot.

Still further aspects of the invention involve processes for making composite structures, such as golf club heads, works of art and mechanical structures, wherein the preform or reinforcement is a naturally occurring starting product, such as wood, paper, cotton or wool, that contains one or more of a cellulose, semi cellulose or lignin, which is subjected to heat under pyrolyzing conditions to form a porous char that is infiltrated with a matrix forming material, such as molten metal, alumina sol gel, or a resin which can be a thermoplastic or thermoset.

Further novel aspects of this invention include golf club structures comprising the following:
1. A golf club that contains more than 50% ceramic phase.
2. A golf club that contains a continuous ceramic phase.
3. A golf club that contains both a continuous ceramic and metal phase.
4. A golf club consisting of multilayer composites.
5. A golf club containing two or more multilayers of wood, metal/intermetallic, ceramics, plastic, composite.
6. A golf club containing fiber reinforced metal.
7. A golf club containing whiskers in a matrix of metal/intermetallic, ceramic, plastic.
8. A golf club containing fibers and whiskers in any matrix.
9. A golf club containing whiskers attached to fibers or particles in any matrix.
10. A golf club from a material containing an intermetallic phase.
11. A golf club containing carbon or graphite as a reinforcement or matrix.
12. A composite golf club in which the reinforcement or matrix contains a form of silicon carbide.
13. A golf club or shaft containing a multiplicity of hollow forms.
14. A golf club or shaft consisting of a composite made from hollow forms.
15. A golf club utilizing a fullerene molecular structure.
16. A golf club with a carbide containing alloy composition in its surface.
17. Ibid 16 from a fullerene containing precursor.
18. A golf club with a diamond-like carbon or diamond coating.
19. Ibid 18 from a fullerene-containing precursor.
20. A golf club containing a carbide as at least one constituent.
21. A golf club utilizing a graphite structure as a monolith or composite, which has its surface, converted to a single or mixed carbide.
22. Ibid 21 in which the graphites structure contains whiskers which may or may not be attached to a graphite fiber.
23. A carbon-carbon composite reimpregnated with a plastic or metal.
24 A golf club containing tungsten selectively distributed the club head to control center of gravity, which is produced by molten metal encapsulation and/or infiltration.
25. A composite golf club head or shaft formed by squeeze casting.
26. A composite golf club composition containing distributed tungsten or other heavy element with a density greater than 10 g/cc formed in-situ to form the golf club in which the tungsten is encapsulated and integral therein.
27. A golf club containing particularate tungsten which becomes encapsulated and/or infiltrated during the club fabrication process.
28. A golf club containing sintered ceramic preform bound with a second phase, which is encapsulated in a matrix metal by casting fabrication process.
29. A golf club containing an element heavier than the matrix or binder metal which is used to form the club.
30. A composite material consisting of at least two elements or different materials compositions mixed together and formed to produce a composite with little to no remaining porosity which is fabricated into a golf club comprising the hitting portion and/or shaft. Either composition may be metallic or non-metallic that includes carbon or ceramics which may consist of particularate or fibrous forms with at least one phase of the composite continuous throughout the component. One phase may be advantageously concentrated in select portions or areas of the golf club. The composite composition may be formed in the absence of any molten phase via solid state reactions, however, in some select cases wherein an intermetallic is formed, a molten phase may be advantageous. A molten phase may also be advantageous to encapsulate a non-reactive component such as a heavy element, carbon or ceramic.
31. A composite containing fullerenes that forms a subcomponent or the entire golf club with the fullerenes in the form of
   A) fullerenes containing soot, as produced, for example, by the Huffman/Kratchner process
   B) refined into select molecular weight from $C_{60}$ to $C_{500}$.
   C) fullerene nanotubular shapes containing singular and multiwalled
   D) fullerenes of all types mixed with other reinforcements in matrices of plastic, metal or ceramic
33. A golf club subcomponent such as a club face insert or sole produced from multilayers of the same or alternate materials including alternate soft and hard layers.

DETAILED DESCRIPTION OF THE INVENTION FIBER REINFORCED METALS

Figure 1:
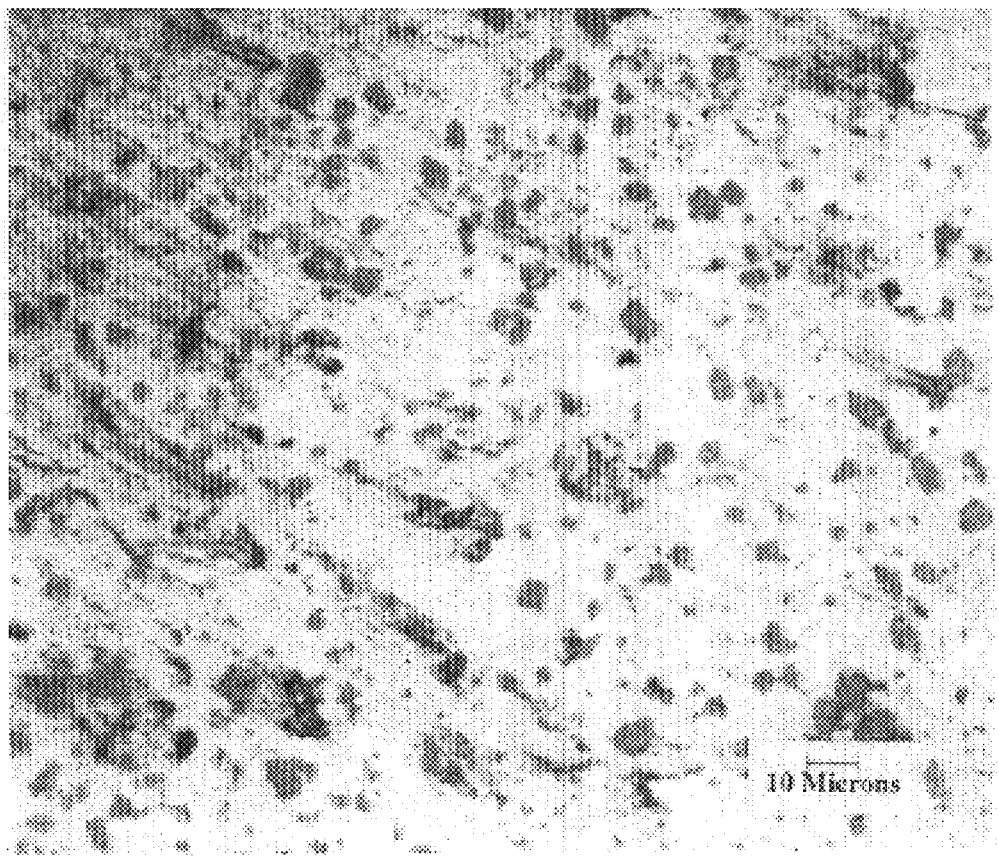
FIG. 1 is a photomicrograph illustrating the uniform distribution of nanoparticles in a squeeze cast aluminum matrix.

A hollow cathode plasma sputtering system is utilized to produce metal or metal alloy coatings on select reinforcing fibers to be incorporated in golf club structures. The hollow cathode plasma sputtering system can be used to apply a coating of any desired composition to select fibers. Multilayer coatings can be applied as desired. Fiber materials may be select organic fibers, glass or quartz fibers, ceramic fibers such as oxides (alumina based), carbides (e.g. SiC, $B_4C$, etc.), borides (e.g. $TiB_2$), boron, graphite, etc. The fibers are passed in a spread condition through the sputter coater and single or multilayer coatings are applied to a thickness that will provide the desired volume loading when subsequently consolidated. An example of a multilayer coating is with the use of graphite fibers and a bonding or barrier layer such as titanium, molybdenum, zirconium, etc. followed by a matrix coating such as aluminum, magnesium, copper, titanium, steel, etc. In the case of an aluminum matrix the initial coating not only provides bonding between the fiber and matrix but also prevents adverse reaction between aluminum and graphite to form the moisture sensitive aluminum carbide that will degrade the composite. In the case of a copper matrix, a metal such as molybdenum will form a bond with the graphite and alloy with the copper during subsequent diffusion bonding with heat in the consolidation step. The metal-coated fiber is then laid up in the desired fiber architecture for making a golf club component and subjected to heat and pressure to cause the metal to bond into a solid continuous matrix phase.

If the fiber is an organic, it must have the thermal stability to permit the consolidation step. Since aluminum and magnesium can be consolidated at relatively low temperatures, they are the most appropriate matrix materials for organic fiber reinforced metal matrix composites.

The metal-coated fibers that are molded into a composite golf club structure may be the face of a club, the sole of a club, the entire club head (either "wood" or "iron"), the shaft or the shaft and club molded together as one piece. The ratio of fibers to metal matrix will determine the performance of the club as well as the type of fiber and metal of the matrix. Graphite fibers are lightweight and can be obtained with high strength and stiffness, but generally have relatively poor wear resistance, which is of concern for head materials but generally is not a problem for shaft materials. In contrast, a ceramic fiber possesses excellent wear resistance and hardness, but it is heavier than the graphite.

Excellent combinations of matrix and reinforcement materials for a golf club head (wood or iron) as well as a clubface or sole are:

| Matrix | Reinforcement |
| --- | --- |
| Aluminum | Graphite |
| Copper | Graphite |
| Aluminum | Ceramic (oxide or carbide) |
| Copper | Ceramic (oxide or carbide) |
| Aluminum | Organic |
| Titanium | Ceramic (oxide or carbide) |
| Steel | Graphite or Ceramic |

Shaft materials combinations include:

| Matrix | Reinforcement |
| --- | --- |
| Aluminum | Graphite |
| Aluminum | Organic |
| Aluminum | Ceramic |
| Titanium | Ceramic |
| Steel | Graphite or Ceramic |

An alternative to utilizing fibers that are separately formed such as graphite, ceramic or organic, is a fibrous preform can be produced from naturally grown or produced materials comprised of one or more of cellulose, semi-cellulose or lignin. An example is plants or wood which contains nature produced fibrous contents. Paper is also a fibrous material that has been extracted from wood or plant materials other examples are cotton staple and wood staple. These natural fibrous products can be heat treated to remove the low temperature volatiles and produce a charred fibrous remains. The heat treatment or pyrolysis temperature should be high enough to remove all water type substance which generally can be achieved at 100° C. (212° F.), but to produce a char or carboneous residue the pyrolysis temperature should be higher. There is no limit to the maximum heat treatment temperature when carried out in an inert atmosphere that prevents the carbon from oxidizing. The cellulosly fibrous materials will begin to form carboneous chars in the range of 350° C. (662° F.) and becomes complete carbon char by 850° C. (1562° F.) in the absence of air. The volatile substance leaves a void in the wood or natural grown material which can be reinfiltrated with plastics, ceramics and metals. After the wood or other natural grown material, or molded paper has been heat treated to produce a char, its flammability has been reduced and it is no longer subject to rotting, termites or other degradation or corrosion. When ceramics or metals are reinfiltrated into the charred body the composite is completely fire resistant and is corrosion resistant to virtually all environments. The reinfiltration of a plastic, ceramic or metal into a charred preform produces a carboneous reinforced composite with a matrix of the infiltrated material. The infiltration process can be by known means such as resin transfer molding, sol-gel or organometallic precursor for the ceramic matrix and casting a molten metal. Vacuum differential transfer is an excellent method of infiltrating the liquid matrix precursor into a charred preform. Squeeze casting is particularly advantageous for liquid metals since it freezes rapidly and does not cause a large temperature rise in the charred preform. In the case of aluminum which melts at 660° C., the preform need not necessarily be heat treated to 660° C. or above in order to infiltrate with aluminum by squeeze casting. For example, a wood preform could be charred to 450° C. and placed in a squeeze cast die that is preheated up to 450° C. Molten aluminum with a superheat of 100° C. that is 760° C. could be squeeze cast into the preform wherein the aluminum freezes within seconds and the preform does not experience a temperature rise much above the 450° C. char temperature. Of course the wood preform could have been heat treated to a much higher temperature that provides more porosity that will be filled with aluminum. In the instant invention wood and cellulose preforms have been charred up to 3000° C. (5432° F.) and then reinfiltrated with plastics, ceramics and metals. Example plastics have been thermoset resins and thermoplastic materials. Ceramics have included oxides, carbides, and nitrides, and mixtures of these produced from sol-gels and metal organic after heat treatment or pyrolysis. In the case of metals the light metals such as magnesium and aluminum, casting compositions such as zinc based casting alloys, copper and alloys such as brasses and bronzes, steels, titanium and even the refractory metals can be cast into the pyrolized preforms. Other reinforcement infiltrants can also be utilized such as small particles of ceramics or metals in the charred preforms. For example, a nanoparticle suspension can be vacuum infiltrated into the char preform and the carrier volatilized followed by infiltration of one of the matrix types such as plastics, ceramics or metals. Of course the particulate can also be carried by the matrix filler material. This is particularly desirable for a golf club. A block of wood may be fashioned to form a golf club, charred and then infiltrated with ceramic particles with a high concentration on the face. The preform can then be squeeze cast with a metal such as aluminum, copper or steel alloys and the face is hardened due to the ceramic particles. Heavier metals such as tungsten particles can be infiltrated into select portions of the club to provide weighting as desired for performance enhancement.

The charred natural product can exhibit mechanical properties substantially enhanced over the original. For example wood is not very stiff compared to metals. Thus when a metal is infiltrated into the wood char the composite possesses much higher stiffness and also increased strength which is proportional to the metal content and the metal type. Thus steel is stiffer than aluminum as well as stronger. Ceramics are even stiffer than metals and combinations of metals and ceramics as matrices are of course in between stiffness and strength of each component. Thus wood or other natural grown fibrous materials can be heated to a char that provides a porous fibrous array which can be reinfiltrated with plastics, ceramics and metals to produce a composite that is stiffer and stronger as well as fire resistant and corrosion or degration resistant compared than the original wood. Such a composite is an excellent product for structural, artistic and many uses including golf clubs.

CERAMIC PARTICLES IN METAL MATRIX

Ceramic particles that constitute more than 50 v/o are preformed into the desired reinforcement configuration using an organic binder or consolidated without a binder such as by die pressing or isostatic pressing in soft tooling. The preform is contained within a die cavity configured to form the desired golf club structure that will permit infiltration with a molten alloy. Any organic binder residue from the preform is removed by solvent extraction or thermally and the desired metal alloy is then infiltrated in a molten state into the preformed ceramic particles. After full penetration of the molten metal matrix into the preform, the die is cooled to result in a ceramic particle reinforced metal matrix containing greater than 50 v/o ceramic particles. The shape, size and composition of the ceramic particles can be adjusted to produce composites with very high quality mechanical properties; particularly stiffness, strength, hardness and wear resistance. The metal alloy influences the properties of the composite through its inherent properties as well as its ability to wet the ceramic particle and provide good infiltration into the preform but preventing any adverse interface reactions between the ceramic particle and metal. The concentration of the ceramic phase in the molten metal can be selectively graded to the surface to provide a very hard wear resistant surface. This can also be accomplished through a preferred reaction that occurs during the matrix metal infiltration.

A further aspect of the present invention involves treatment of the ceramic preform to cause whiskers to form in the void space between particles that will provide an improved composite for golf club applications. Particles can be ceramic or metallic. In the case of metallic particles, they may react with the matrix to form a new material, such as given in Example 9 described below, that formed titanium aluminide or non-reactive metals such as tungsten. In the latter case, the selective placement, i.e. concentration, of the heavy tungsten can be used to adjust the center of gravity of the club making it heavier in the toe, head, sole, etc.

The size of the ceramic hard particles can have a major influence on the properties and performance of the composite. For example, if relatively large particles, that is approximately 20 microns or larger, are used a soft metal matrix can be damaged between particles which is referred to as birnelling. The smaller the ceramic particle, the smaller the distance between particles. However, heretofore it has not been possible to infiltrate a molten metal in highly dense small particle arrays. The force required for infiltration is described by Darcey's law.

Using forced metal infiltrating in accordance with one aspect of the present invention, it is possible to infiltrate ceramic particle arrays with particle sizes in the low micron size as well as submicron size also referred to as nanometer size. A composite consisting of 50% or greater of small particle size and particularly in the submicron/nanometer size infiltrated with aluminum by pressure infiltration produces a very hard wear resistance composite surface that does not suffer from birnelling or damage of the matrix between the particles.

CONTINUOUS CERAMIC AND METAL PHASE COMPOSITES

The metal-ceramic composite discussed below in Examples 10 to 24 have a continuous metal phase and the ceramic phase is discontinuous.

Another type of metal-ceramic composite is one in which the metal phase and ceramic phase are both continuous. The composite of Example 25 has a continuous phase of both the metal and ceramic. This type of composite is produced by forming a ceramic preform similar to that described in Examples 10 to 24. After the ceramic particle preform has been produced, it is raised in temperature until sintering is initiated between the particles. Sintering is continued until a ceramic bond is formed between the particles, but sintering is stopped before the pores are closed. The object is to achieve sintering between the ceramic particles but to maintain an open pore structure in which the molten metal will be subsequently infiltrated to form the continuous metal phase.

A sintering aid may be used to increase the sinterability of any ceramic and especially the covalent bonded particle materials such as SiC, $Si_3N_4$, $B_4C$, etc., that otherwise will not self sinter. After the ceramic phase is sintered, it will have considerable strength over any non-sintered ceramic phase composite. The size of the particles, particle distribution and the degree of sintering can be controlled to achieve the volume fraction of the ceramic phase. In general, a particle sintered ceramic which maintains an open pore structure will have a density in the range of about 40 to 90% of theoretical which leaves 60 to 10% metal phase. Lower ceramic phase compositions may be obtained through the use of ceramic foams such as reticulated structures or the use of short fiber materials whose packing density can be as low as about 10% and as high as about 60 to 70%. Thus, through the use of ceramic phase configuration and the degree of sintering, the ceramic phase fraction can be controlled over a wide range of about 10% up to about 90%.

After the ceramic phase has been produced into a continuous sintered body with a remaining open pore structure, molten metal infiltration can be accomplished to produce a continuous metal phase. The metal infiltration step for continuous phase ceramic-metal composites, as prepared in Example 25, can be accomplished in the same manner as the continuous metal phase infiltration for Examples 10 to 24.

TUBULAR (HOLLOW) REINFORCEMENT COMPOSITES

One objective of the present invention is to provide a golf club or shaft that possesses as low a density as possible in order to achieve a desirable size club with a prescribed weight. The weight per unit area or aerial density of any material can be lowered with the use of hollow or thin walled material. An example can be given using a section of a steel golf club shaft. If a steel shaft is 0.5 inches diameter with a wall thickness of 0.016 inches, the weight will be 0.08924 lb. per foot. If a small diameter steel tube 0.008 inches diameter with a wall thickness of 0.002 inches were utilized in a thickness of two layers to make up a 0.5 inch diameter larger tube, the calculated weight saving per foot is approximately 41%. If aluminum were used as a bonding agent, or braze to join the small steel tubes into the 0.5-inch diameter steel tube, the weight savings per foot would be reduced to approximately 33%. If the steel tubes were slightly larger than the 0.008 inches with the same wall thickness, the weight savings would be greater and similarly if the steel tubes were slightly smaller, e.g. 0.006 inches with the same wall thickness, the weight savings would be slightly reduced. Greater or lessor weight savings would similarly be achieved with a larger steel tube diameter than 0.5 inches or that tube's wall thickness differing from 0.016 inches thick.

The above compares the weight savings of using an array of small steel tubes to replace a solid wall steel tube. The effective stiffness of the array of small steel tubes will be greater than with the single wall steel tube. Lighter weight and increased stiffness is a desirable feature in a golf shaft. The array of hollow steel tubes is also an effective way to reduce the weight of the club itself. Thus, it is possible to produce a golf club utilizing the hollow tube concept for both the club and the shaft.

Hollow components other than steel tubes can also be utilized in the golf club or shaft. Other potential hollow articles can be hollow glass fibers, hollow ceramic fibers such as SiC or other carbides, and many oxides, nitrides and borides, and hollow spheres in a variety of materials such as glasses, carbon, ceramics and metals. These hollow articles can be utilized in plastic, metal, ceramic or carbon matrices to produce golf club components that are lighter and stiffer. Polycapillaries can be made in many materials, which are a parallel array of small capillary tubes typically joined to each other. It is possible to arrange polycapillaries in layers in which the direction can be at some angle to the preceding layer such as 45°, 90°, etc. Polycapillaries in lightweight ceramic compositions such as alumina, silicon nitride, etc. can be filled with plastics or metals to form golf club heads or shafts.

WHISKERIZED FIBER REINFORCED COMPOSITES

Figure 7:
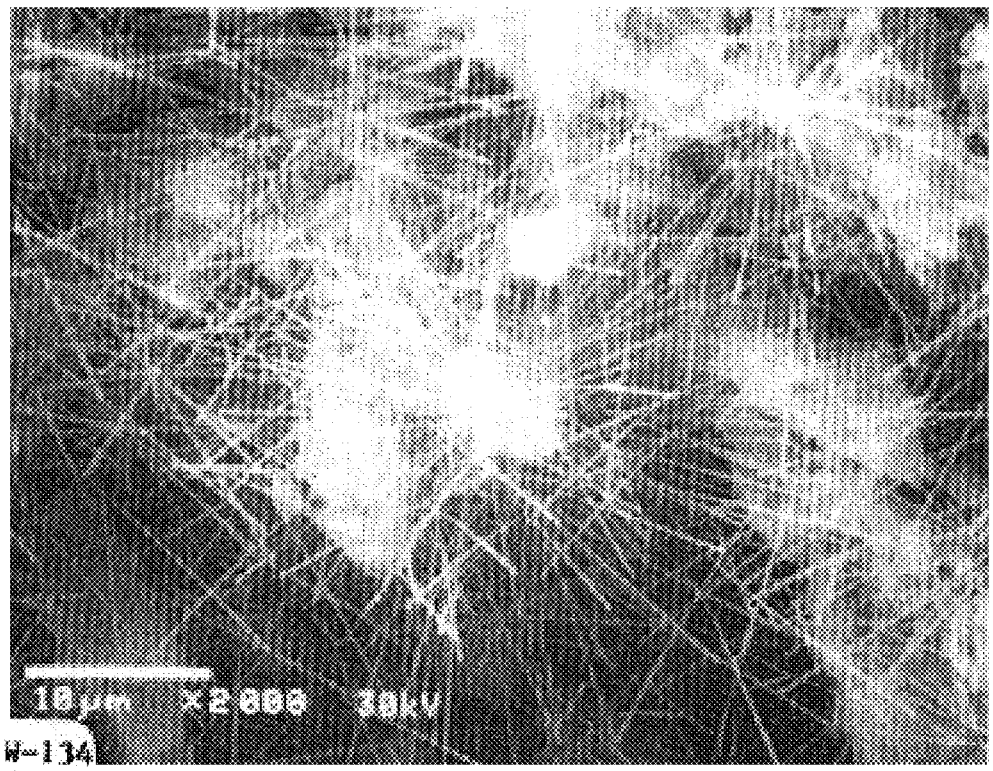
FIG. 7 is a scanning electron Micrograph (SEM) of $Al_2O_3$ whiskers growing off the surface of particles.

One of the major limitations of composites is the shear strength at the matrix reinforcement interface. This is particularly true for fiber reinforced composites. For example, it is well known with glass fiber or graphite fiber reinforced plastics, there is extensive technology required in coupling agents, which enhance bonding between the fiber and the plastic matrix. The quality of a composite is measured in the shear strength, which is in effect the bonding strength between the fiber and matrix. Many if not most design limitations are limited by the shear strength of the composites. And in golf clubs, and particularly the shafts, the torsional modulus and strength are limitations which in part also relate to the bonding between the fiber and matrix. An approach to improve the shear strength of composites no matter the matrix as well as the torsional strength and modulus is to grow whiskers off the surface of graphite or other ceramic fibers. This whisker growth off the surface such as illustrated in FIG. 7 provides mechanical attachment as well as a different fiber surface chemistry to enhance the bonding between the matrix and fiber. For example, the shear strength of a plastic or metal matrix graphite fiber composite is generally in the range of a few hundred psi to a very few thousand psi (e.g. 500–2000 psi) but when SiC whiskers are grown on the surface of graphite fibers the shear strength equals the strength of the plastic matrix and in the case of metals can be in the range of 8,000–30,000 psi. In addition, to the enhancement of mechanical properties of whiskerized graphite composites other properties such as wear resistance, hardness, etc. are substantially improved.

CARBON MATRIX COMPOSITES

Carbon is a very light weight material and is quite wear resistant unless converted to the graphite crystal structure which is a layered structure that is quite soft, lubricating and has poor wear resistance. Carbon as a matrix in composites is typically produced by pyrolyzing a select plastic material or pitch. If the reinforcement is graphite fiber, the composite is referred to as carbon-carbon composites. Typical carbon matrix precursors are pitch and resins such as phenolics. A carbon-carbon composite is generally produced by impregnating a reinforcement such as graphite fibers as well as particularate reinforcements with the carbon precursor followed by pyrolyzing as known in the art to produce carbon as the matrix. Since pitch or resins produce only about 50–65% carbon on pyrolysis, the carbon matrix is porous from the shrinkage and mass loss from the valatities of the carbon precursor. Reimpregnation is generally conducted for two to five times to produce a near theoretically dense carbon matrix (carbon-carbon composites).

In the case of Example 30 described below, when the phenolic resin is impregnated into the reinforcement (graphite fiber, ceramic fiber or particularate without or with whiskers) the resin may contain very small particles (preferably submicron in diameter). When the resin is pyrolyzed as given in Example 30, the particle can form a carbide that will provide a very hard wear resistant matrix material that is excellent for a golf club head. Examples of suitable particles are metals that form carbides such as boron, silicon, tantalum, niobium, molybdenum, tungsten, etc., or compounds such as $B_2O_3$, $SiO$, $SiO_2$, $MoO_3$, etc., that react with the carbon to form carbides. The light carbides such as $B_4C$ and SiC are most desirable since a lightweight golf club head is desired.

The remaining porosity of the carbon matrix can be infiltrated with a metal to form a hybride composite such as aluminum, silicon, copper, etc.

MULTILAMINAR COMPOSITES

Since a golf club head must sustain substantial impact (possess high toughness) as well as process high hardness and wear resistance, another type of composite other than fiber or particle reinforced composite can meet these demands. In accordance with the present invention, multilaminar composites which consist of alternate layers of different materials is a complex composite type which can possess exceptional high toughness, hardness, wear resistance, strength, stiffness, etc. The alternate layers can vary considerably in their individual thickness as well as compositions. Layer thickness can vary from a few microns to several thousand microns and compositions can be metal, ceramic, plastic, wood or composites utilized in virtually any alternate layer combination. Examples of suitable combinations of the respective layers are metal-metal, metal-plastic, metal-wood, metal-ceramic, metal-composite, ceramic-plastic, ceramic-composite, or virtually any combination of the fiber materials. Moreover, in accordance with this invention the complex composite structure is not limited to binary combinations. Thus, the complex structure may comprise tri-combinations of e.g. metal-plastic-ceramic, or composite-wood-ceramic, metal-metal-ceramic, etc. Each layer thickness in the multilayer composite may vary from the other layer thicknesses. Composites of the same composition can also be formed such as soft and hard compositions of the same material. One problem with a golf club face is that the grooves wear, including uneven wear from the top to bottom or upper and lower surface of a groove. Not only with alternate materials but with the same material soft and hard alternate layers can be used. The soft layer can erode or wear and the hard will not which will maintain the groove in excellent condition for repeated use whereas grooves in the same hardness face will wear unevenly. Examples include soft chemically pure titanium in an alternate layer with a much harder titanium alloy and/or a titanium compound such as a carbide, boride, nitride, etc. Another example could include soft mild steel with alternate layers of hard steel such as tool steel, armor steel, etc. The soft and hard alternate layers can be the same alloy type such as steel-steel, Ti-Ti or alternate materials such as Ti-epoxy-Ti, Al composite-Al-Al composite, etc.

The multilayer composites of the complex structure can be produced by diffusion bonding, any plating or deposition process, sintering, brazing, gluing or joining procedure. Forming in the shape of a golf club head, face insert, sole, hozel or any subcomponent of a golf club head is the objective of this case.

BUCKYBALL/FULLERENE/BUCKYTUBE AND ALLOYED SURFACES

Current metal golf clubs including "irons" and "metal woods" performance can be improved at least in cosmetics if the surface is hardened. Many processes for alloying or hardening the surface of steel and/or titanium golf club heads are well known. In the case of steel, carbiding, boriding and nitriding can readily be accomplished and thereby increase the hardness of 17-4 pH stainless steel from about Rc 40–50 to Rc 60–65. Such surface alloying and coating processes have long been known for other purposes, but have not been used to treat golf clubs.

Harder coating compositions such as the nitrides and carbides of boron, silicon, the refractory metals and rare earths and some oxides such as the oxides of elements in Group II through VI and the rare earths are much harder by a factor of 3 to 5 than the nitrided or carbided steel. However, it is difficult to apply these harder carbides or other compositions to steel and particularly to withstand the impact associated with golf club usage. For comparative hardness, Rc60 is approximately 732 on the Knoop scale and TiC is 2500–3500 Knoop depending on how it is produced. However, if TiC is applied directly to steel, it generally will not adhere and will crack during impact. TiC is a precipitant in some steels but its surface composition is typically too low to enhance the surface hardness.

In accordance with a further aspect of the present invention, it has surprisingly been found that "buckyballs," generically known as fullerenes, which is the third form of carbon, in addition to graphite and diamond, can very easily be evaporated into thin layers that are applied to the surface of metal alloys such as steel, the iron group metals and titanium that contain alloying elements that include titanium, chromium, vandium, silicon, yttrium and the rare earths in the 4f and 5f series and the refractory group metals. The fullerene coated metal may be caused to react with the metal alloy surface by heating generally in a furnace or heated directly on the surface with a plasma, ion beam, electron beam, or laser, whereby a carbide containing the buckyball is formed or alloyed on the surface of the metal golf club. Alternatively the fullerene carbide surface may be formed by applying the fullerene to the metal alloy surface and applying a second coating of the carbide forming element. As an example a fullerene thin film can be applied to a steel surface followed by a titanium film applied by a deposition method or powder which on heat treatment or surface irradiation will form a hard carbide surface consisting primarily of titanium carbide in this example. By this method, the buckyball carbide becomes alloyed to a metal golf club surface or any component surface and is very hard, in the range of 3000 Knoop, and is not generally cracked by the impact associated with a golf club striking a golf ball. To improve the toughness and impact resistance of the buckyball carbide, other alloying metals that do not form carbides such as copper can be added with the carbide former in percentage of a few percent up to about 50%. The important discovery is that the buckyballs provide an alloying bridge to the steel or titanium golf club surface and produces a carbide alloy surface that can be quite hard. The buckyball alloying layer can be applied by evaporation to the metal surface or by solution precipitation, since buckyballs are soluble in a variety of solvents known in the art, notably organic solvents such as toluene.

Alternatively, the fullerenes or buckyballs can be utilized in various matrices to form a golf club, shaft or face insert. The fullerenes which includes single and multi-walled nanotube shapes can be preformed and various plastic, metal or ceramic matrices infiltrated to produce a composite or mixed with the matrix to form the composites. An example is a preform of a fullerene (buckyball, buckytube or mixture of each) and then infiltrated with either a plastic matrix or metal matrix. The preform can be in the shape of a club, shaft or face insert to a club. Alternatively, these same matrices can be mixed with the fullerene and then formed by casting or other forming techniques to produce a club, face insert or shaft. The fullerene can constitute the entire reinforcement or can be mixed with other reinforcements such as ceramic particles or fibers, graphite particles or fibers including amorphorous forms of carbon and metal particles or wires, or combinations of these other reinforcements. A plastic matrix can be soft for putter type golf club inserts or hard for irons or woods. Metal matrices can include aluminum, copper alloys (i.e. brasses, bronzes, etc) and steels or any of the iron group metas. Titanium can be used as a matrix but it is known to form carbides which can cause brittleness if in high concentration.

The use of buckyballs to produce improved golf clubs is further described in Examples 45–51 below.

Buckyballs or fullerenes can be produced by well known methods in the art as described in U.S. Pat. No. 07/930,818 "Methods and Apparati For Producing Fullerenes" Filed on 08/14/92 by Withers et al, including the Huffman/Kratchner process described therein and in the article Kratschner, W. Lamb, L. D., Fostiropoulos, K. & Huffman, Dr. Nature 347, 354–358, (1990), cited in said U.S. Patent Application.

INTERMETALLICS AS GOLF CLUB HEADS AND GOLF CLUB SHAFTS

The desirable features of a golf club head and shaft have been stated in the above descriptions. One of the most important properties is lightweight in addition to hardness and wear resistance. A class of materials which possess these properties and which offer excellent potential as a golf club or shaft material in accordance with the present invention is intermetallics. Intermetallics consist of two metallic elements, which form a new compound that has properties differing from either metal components and generally has improved hardness, strength, modulus, etc. Examples of intermetallic compounds are crystal structures that include B2, $DO_{23}$, L12, C15, A15, L10, $DO_{19}$, $DO_{22}$ but is not limiting to all possible intermetallics. Intermetallic compounds or alloys include $Fe_xAl$, $Ni_xAl$, $Ti_xAl$, where x=1 or 3, NiTi, $MoSi_2$, $Ti_5Si_3$, $Al_5CuTi_2$, $Nb_xAl$ x=2 or 3, $NbAl_3$, $Be_{12}Nb$, $Be_{17}Nb_2$, $Be_{12}Ti$, $Cr_2Nb$, $Cr_3Si$, $Cr_3Si_3$, $Cr_2Ti$, $SiV_3$, $Si_3V_5$, etc.

The intermetallics may be utilized as pure compounds or alloyed to enhance select properties such as ductility, hardness, etc. It is not unusual for one to five elements to be micro and macro alloyed to produce select properties. Some examples of such alloys are Ti25Al-11Nb, Ti-22Al-27Nb, Ni-12Al-40Fe, Ni-20Al-30Fe, Ti-48Al-2Mn and which may contain macro and micro alloying elements to improve corrosion, hardness, elongation (ductility), fracture toughness, etc. An example includes adding boron to increase hardness and ductility of $Ni_3Al$, and when boron is added to Ti-Al-Nb alloys a $TiB_2$ precipitate in the form of whiskers or particles occurs which substantially improves hardness and wear.

The density of many of these alloys are quite favorable for golf club and shaft applications compared to the often used golf club materials of steel and copper.

| Material | Density g/cc* | Hardness Rc* |
|---|---|---|
| Steel | 7.8–8.2 | 40–60 |
| Copper | 8.5–9.0 | 20–50 |
| Ni—36Al—2B | 5.6 | 60 |
| NiTi | 7 | 30 |
| $Ti_5Si_3$ | 4.3 | 80 |
| $Ti_3Al$—11Nb—3B | 4.3 | 80 |
| $Be_{12}Ti$ | 2.25 | — |
| $Be_{17}Nb_2$ | 3.2 | — |

*depends on alloy composition

The properties of intermetallics as a class of materials are excellent for golf clubs due to their light weight, high strength, high hardness and they can be processed by conventional metallurgy of casting, hot and cold working, powder molding and sintering, and as previously discussed, squeeze casting aluminum into the elements that form aluminides.

EXAMPLES

1. A metal coating was applied to a ceramic fiber array by passing the fiber array through a molten bath of the metal matrix followed by diffusion bonding of the metal coated fibers in a mold to form a composite of the ceramic fibers and the metal. In particular, an array of ceramic fiber, namely, alumina based, ceramic fibers, sold under the trademark Nextel from 3M Company, was passed through a molten aluminum bath and the coated fibers were hot pressed in a mold into a composite at a temperature of at least 400° C. to form a continuous aluminum matrix. The metal coating thickness was controlled to achieve a fiber composition of 40%. Different aluminum coating thicknesses can provide reinforcement controls in the range of 20% to 80%. The resultant composite formed of the ceramic fiber and aluminum matrix can be formed into a golf club configuration during diffusion bonding in a mold configured to form a golf club iron, insert to an iron, driver or in tubular shape to form a shaft.

2. A metal coating was applied to a ceramic fiber array as in Example 1, using three different metal powders, each of which was comprised of very small diameter metal particles in an organic binder. The organic binder used in carrying out the Example was an acryllic, but other such binders could be used, for example, waxes, and a variety of polymers. The diameter of the particles comprising the metal powder should generally be less than 100 microns, preferably less than 40 microns and desirably less than 10 microns and most preferably less than 2 microns. Ideally, submicron metal particle sizes are used. During the hot consolidation stage the organic binder was burned off before the metal particles were diffusion bonded into a continuous matrix phase with the ceramic fiber. The metal powders, each in separate experimental cases, were aluminum, copper and titanium. The resultant composite of the respective metal and the ceramic fiber can be used as a component of a golf club such as an iron, insert, wood or shaft of a golf club by using an appropriately configured mold during the consolidation and diffusion bonding step.

3. Graphite fiber, Hercules IM9, was pneumatically spread to form an array and coated in a hollow cathode plasma sputter coater with an initial layer of 0.05 to 0.1 micron of molybdenum followed by a layer of 1.2 microns of copper. The coated graphite fibers of the array were laid up in a pattern of 0–90–0–45–0–45 tow orientation and diffusion bonded at 925° C. and 2,000 psi for one hour using a mold configured so that the resulting composite was molded into the shape of a sole and face of a golf club head. The resultant composite contained 60 v/o graphite fiber and 40 v/o copper. The molybdenum initial coating layer bonded well to the graphite fiber during the diffusion bonding and alloyed with the copper to provide a well-bonded composite. Without an interlayer, such as molybdenum, copper does not bond or wet graphite and a poor composite results. The interface bonding layer can be any metal or compound that wets, bonds or reacts with the graphite and has solubility or alloys with the matrix or copper in this case. Metals that are known to bond well to graphite are molybdenum, tungsten, titanium, niobium, nickel, cobalt, iron, titanium, zirconium and compounds such as molybdenum oxide, tungsten oxide, boron and boron oxide.

4. Graphite fiber coated with copper using an interlayer of molybdenum as described in Example 3 was combined with 15 micron SiC fiber which had a two-micron copper coating to make a lay-up for a golf club. The fiber ratios were 50 coated graphite and 50 coated SiC. The combined copper coated graphite fiber and copper coated SiC fiber lay-up was diffusion-bonded, as in Example 3 to produce a composite golf club sole and face. The resultant composite was determined to have improved hardness and wear resistance over the all coated graphite fiber composite of Example 3 and can be used as any component in a golf club, as mentioned in Example 1.

5. Graphite fiber, Hercules IM9, was pneumatically spread and coated with titanium to a thickness of 0.05 to 0.1 micron followed by one micron coating of 6061 aluminum. The coated fiber was hot consolidated at 550° C. and 5000 psi for one hour into a tubular shaped mold to form a golf club shaft.

6. Graphite fiber of Example 5 was coated only with titanium (i.e. without the aluminum of Examples 1 and 2) and aligned in a mold with molten aluminum poured into the mold and solidified. The titanium coating provided excellent wetting of the aluminum and provided a barrier that prevented reaction of the molten aluminum with the graphite. This Example involved applying a titanium coating on graphite fiber as described in Example 5, but using titanium that is thicker than that of Example 5 such as one micron or more, then the titanium coated graphite fiber was placed in a mold shaped to form a golf club shaft as in Example 5 and molten aluminum was poured into the coated fiber array to form a titanium aluminide matrix through reaction of the molten aluminum with the titanium. The coating operation of infiltrating the aluminum in the fiber array can be accomplished by pressureless infiltration, or by centrifugal or squeeze casting.

7. A prewoven graphite fiber architecture, graphite cloth, was coated with titanium in the hollow cathode plasma sputter coater and placed in a mold the shape of an "iron" into which molten aluminum was poured; whence an aluminum alloy was cast. The titanium coating provided excellent wetting of the aluminum and prevented the molten aluminum from reacting with the graphite and produced a composite golf club "iron" shaped structure.

8. A preform for a golf club head was wound in the shape of a golf club head with a mixture of PBO fiber and the ceramic fiber Nextel 610. The preform was placed in a mold and squeeze-cast with molten aluminum. The fiber content of the resulting golf club head was 65% and the strength was 1.5 GPa. Such a fiber-reinforced composite metal is excellent for the club itself, iron or wood, as well as the shaft.

9. The ceramic fiber Nicalon (silicon carbide) tow was wound on a mandrel followed by vacuum impregnation with a slurry of titanium powder less than 40-micron diameter in an alcohol solvent. The solvent was evaporated leaving a fibrous preform impregnated with particulate titanium. The resultant titanium impregnated fibrous preform then was squeeze cast in molten aluminum to produce a composite in the form of the golf club mold. The final composite was a silicon carbide fiber reinforced titanium aluminide matrix casting suitable for a golf club structure, e.g. an iron, wood or shaft.

Figure 2:
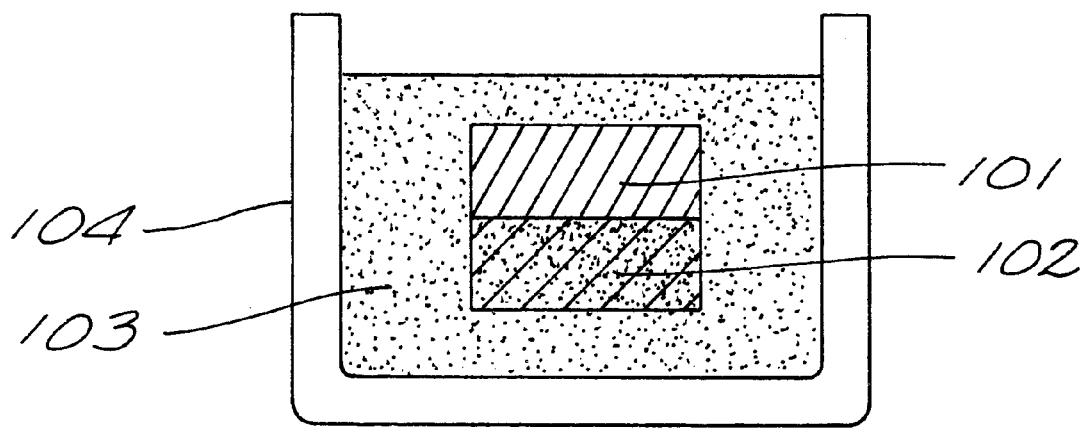
FIG. 2 is a schematic illustration showing a cut-away side view of a casting set-up suitable for carrying out the process developed in Example 10 for making a shaped metal matrix composite body integrally bound to a piece of metal matrix and suitable for making a golf club or component thereof.

10. This Example demonstrates that it is possible to utilize the pressureless infiltration of a molten metal into a shaped preform to obtain a shaped metal matrix composite body which is integrally attached to a solid piece of matrix metal. Referring to FIG. 2, an ingot of matrix metal 101, measuring approximately 5 cm by 5 cm by 3 cm and composed by weight of approximately 9% Si, 3% Mg and the balance aluminum, was placed on top of a preform 102 having approximate dimensions 5 cm in diameter and 3 cm in thickness. The preform 102 was produced by mixing 220 grit and 500 grit SiC particles from Norton and polyvinyl alcohol (PVA) binders from Monsanto. The weight of PVA binder utilized was approximately 3% by weight of SiC. The SiC/binder mixtures were pressed in a steel die to ~1000 psi, which resulted in a preform 102 composed of ~65 vol % of SiC and 35 vol % of porosity. The preform 102 and matrix metal ingot 101 assembly was placed on top of an approximately 1 cm thick layer 103 of boron carbide powders from Johnson Mathey within a graphite boat 104. Additional boron carbide was then added to the graphite boat 104 until the surface of the boron carbide bed was approximately level with the upper surface of the matrix metal ingot 101. The setup, consisting of the graphite boat 104 and its contents were placed within a conventional controlled atmosphere electric resistance heated vacuum furnace (not illustrated) at room temperature. A vacuum of approximately 5 torr was created within the furnace and maintained as the temperature within the furnace was raised from room temperature to about 200° C. The furnace and its contents were held at 200° C. for 30 minutes before pure nitrogen gas was backfilled into the furnace to approximately 1 atmosphere and a continuous flow rate of approximately 2 l/min. was established. The furnace temperature was then ramped up to about 800° C. over about 2 hours, held at 800° C. for about 3 hours; and ramped down to room temperature in about 2 hours. During the temperature excursion, the aluminum alloy of the matrix metal ingot 101 was melted and infiltrated into the porous SiC preform 102. The boron carbide powder 103 was not infiltrated by this procedure and acted as a barrier to the molten metal penetration. Upon reaching room temperature, the setup was removed from the furnace and disassembled. A metal matrix composite comprising the SiC preform 102 infiltrated by the aluminum alloy matrix metal of the ingot 101 with an additional layer of pure matrix metal on the surface was recovered. This Example demonstrates that through the use of pressureless infiltration it is possible to create a shaped metal matrix composite body, which is integrally bonded to a solid piece of excess matrix metal. Such a composite is excellent for an iron, wood, or shaft.

Figure 3:
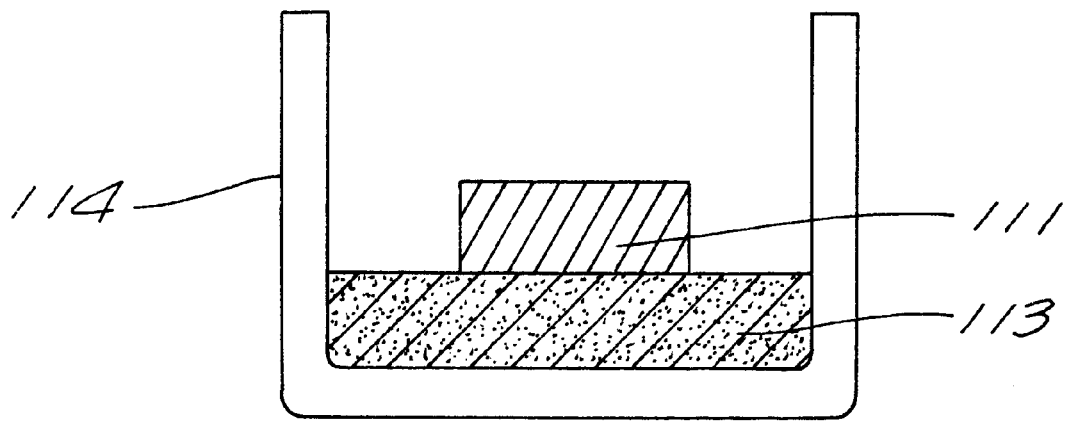
FIG. 3 is a schematic illustration, generally like FIG. 2, showing another set-up suitable for carrying out the process described in Example 11 for making a golf club or component thereof.

11. The following Example demonstrates that it is possible to spontaneously infiltrate a bed of filler material with matrix metal to produce a macrocomposite which comprises excess matrix metal which is integrally attached or bonded to a metal matrix composite which is, in turn, integrally attached or bonded to a ceramic body. Referring to FIG. 3, an ingot of matrix metal, 111 measuring approximately 5 cm by 5 cm by 3 cm and composed by weight of approximately 9% Si, 3% Mg and the balance aluminum, was placed on top of SiC fillers 113 inside an alumina refractory boat 114. The filler composed of 70% 220 grit and 30% 500 grit SiC particles from Norton were well mixed and poured into the alumina boat 114. The thickness of the filler 113 is approximately 2 cm, and is composed of approximately 55 v/o SiC and 45 v/o open pore void. The setup, consisting of the alumina refractory boat 114 and its contents were placed within a conventional controlled atmosphere electric resistance heated vacuum furnace (not illustrated) at room temperature. A vacuum of approximately 5 torr was created within the furnace and maintained as the temperature was raised from room temperature to about 200° C. and maintained at that temperature for 30 minutes before a mixture or argon and hydrogen gas was backfilled into the furnace to approximately one atmosphere and a continuous flow rate of approximately 2 l/min. was established. The furnace temperature was then ramped up to about 800° C. over about 2 hours, held at 800° C. for about 3 hours; and ramped down to room temperature in about 2 hours. Upon reaching room temperature, the setup was removed from the furnace and disassembled. A metal matrix composite comprising the SiC preform filler 113 at approximately 55 v/o infiltrated by aluminum alloy matrix metal from the ingot 111 was recovered. The metal matrix composite is integrally bonded with both the alumina refractory boat 114 and a control layer of excess aluminum alloy matrix metal. The bond is evidenced by the fact that both the excess matrix metal and ceramic alumina boat 114 can not be removed without machining or destroying the composite. The ceramic layer provides a very hard surface to a composite golf club. A variation is to utilize a ceramic polycapillary on the bottom of the alumina container and it can form the base of the golf club. This Example demonstrates that it is possible to utilize pressureless infiltration to create a composite comprising excess matrix metal which is integrally bonded to a metal matrix composite body which is in turn integrally bonded to a ceramic body.

Figure 4:
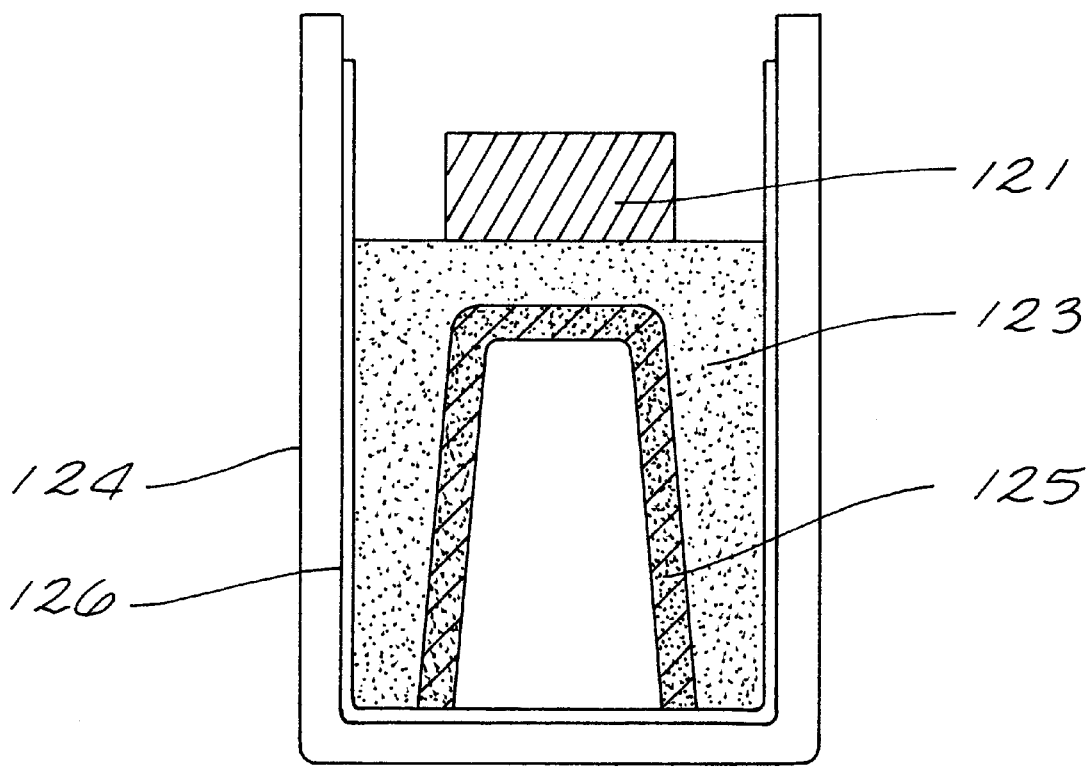
FIG. 4 is a schematic illustration, generally like FIGS. 2 and 3, suitable for carrying out the process described in Example 12 for making a golf club or component thereof.

12. The following Example demonstrates that it is possible to spontaneously infiltrate a shape of filler material with matrix metal to produce a shaped macrocomposite. Referring to FIG. 4, an ingot of matrix metal 121, measuring approximately 5 cm by 5 cm by 3 cm and composed by weight of approximately 3% Mg and the balance aluminum, was placed on top of SiC fillers 123 inside a graphite crucible 124. An insert 125 made of porous alumina was placed in the center of the boat 124. The graphite boat 124 was lined with a thin layer of Grafoil 126 from Union Carbide. The filler composed of 70% 220 grit and 30% 500 grit SiC particles from Norton were filled into the spaces generated between the graphite boat 124 and the alumina insert 125. The thickness of the molded SiC filler is approximately 3 mm, to demonstrate that very thin wall materials can be produced. The setup, consisting of the graphite boat 124 and its contents were placed within a conventional controlled atmosphere electric heated vacuum furnace (not illustrated) at room temperature. A vacuum of approximately 5 torr was created within the furnace and maintained as the temperature was raised from room temperature to about 200° C. The furnace and its contents were held at 200° C. for 30 minutes before a mixture of nitrogen and hydrogen gas was backfilled into the furnace to approximately one atmosphere and a continuous flow rate of approximately 21/ min. was established. The furnace temperature was then ramped up to about 800° C. over about 2 hours, held at 800° C. for about 3 hours, and ramped down to room temperature in about 2 hours. Upon reaching room temperature, the setup was removed from the furnace and disassembled. A metal matrix composite comprising the SiC preform of approximately 65 v/o infiltrated by the matrix metal was recovered. The composite was removed from the graphite boat 124 and the porous alumina insert 125 was removed by sand blasting leaving a cup shaped composite. Alternatively, the porous alumina or a polycapillary ceramic can be used and left integrally bonded to the silicon carbide reinforced aluminum alloy and the ceramic layer becomes the surface of the club. This Example demonstrates that it is possible to utilize pressureless infiltration to create a high volume loaded composite of complicated shape such as golf club head shapes.

Figure 5:
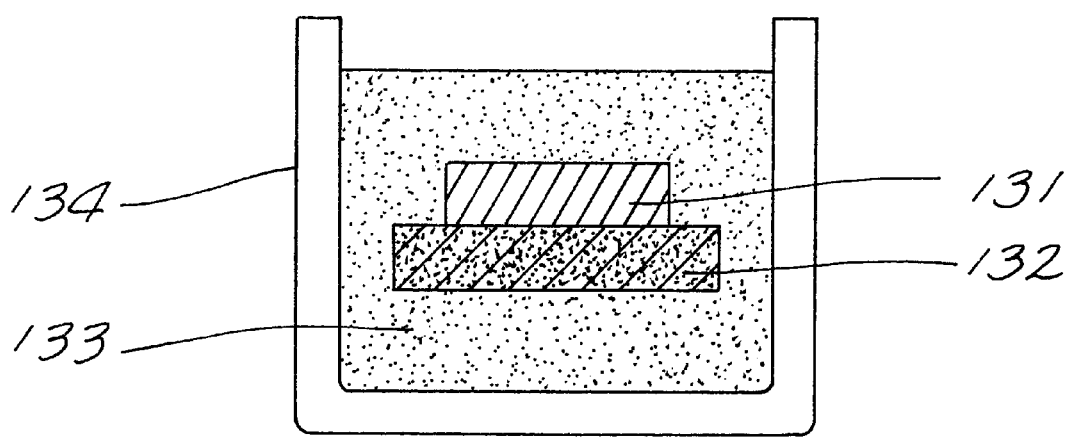
FIG. 5 is a schematic illustration generally like FIGS. 2–4, suitable for carrying out the process described in Example 13, for making a golf club or component thereof.
Figure 6A:
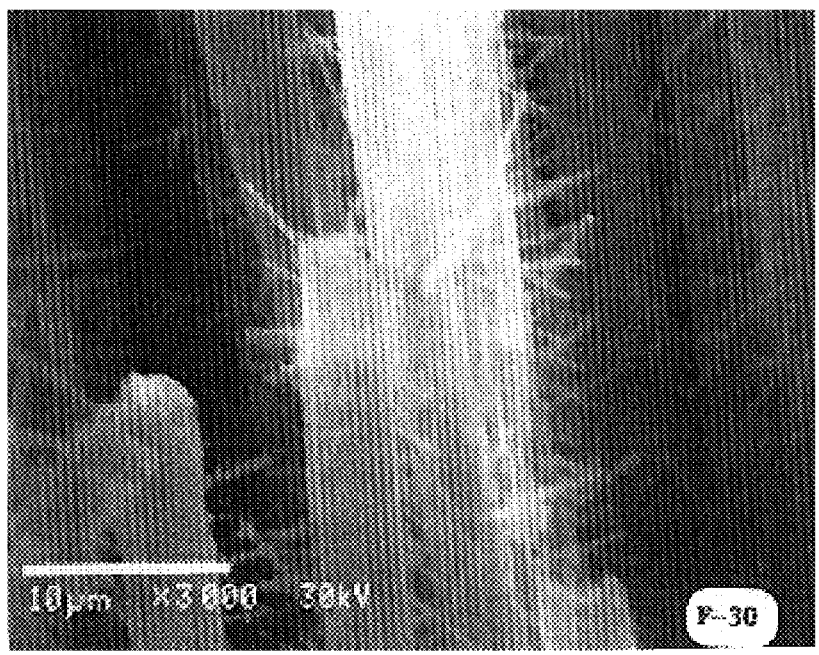
FIG. 6a is a photographic representation illustrating whiskers growing off graphite fibers.
Figure 6B:
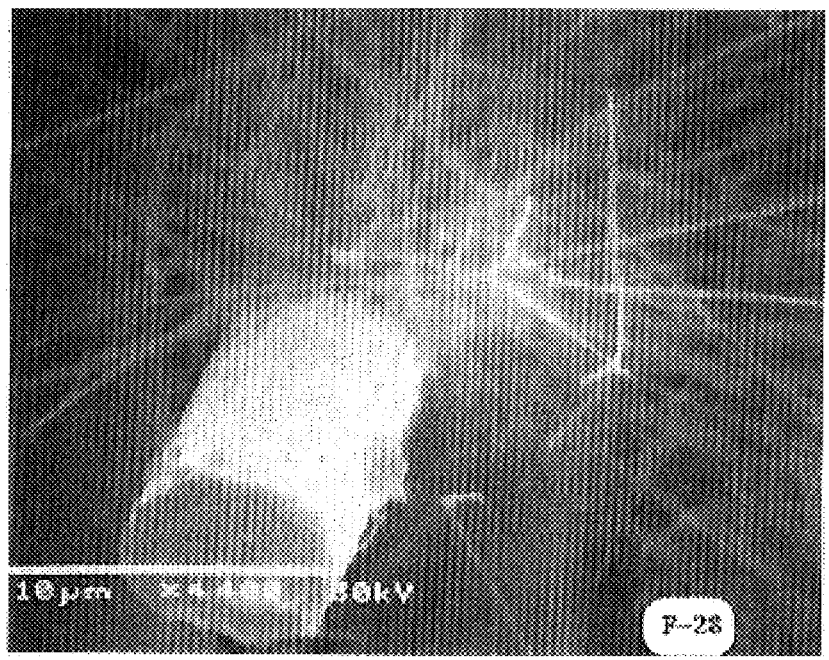
FIG. 6b is a photographic representation in greater magnification than 6a, showing whiskers growing off a single graphite fiber.

13. The following demonstrates that it is possible to produce by pressureless metal infiltration, a macrocomposite comprising a metal matrix composite, which uses different types of fillers such as $Al_2O_3$, AlN, $TiB_2$, etc. Referring to FIG. 5, an ingot of matrix metal, 131 measuring approximately 5 cm by 5 cm by 3 cm and composed by weight of approximately 10% Mg and the balance aluminum, was placed on top of a preform 132 having approximate dimensions 5 cm in diameter and 3 cm in thickness. The preform 132 was produced by 325 mesh alumina powders from Norton and polyvinyl alcohol (PVA) binders from Monsanto. The weight of PVA binder utilized was approximately 3% by weight of alumina. The alumina/binder mixture was pressed in a steel die to ~5,000 psi, which resulted in a preform composed of ~65 vol % of alumina and 35 vol % of porosity. Virtually any ceramic powder or mixture of powders such as $TiB_2$ and AlN can be produced in a preform by pressing, injection molding, slip casting, etc., but may require a different type of binder, such as polyvinyl butyl B76 from Monsanto or others, depending on the forming method. The preform 132 and matrix metal ingot 131 assembly was placed on top of approximately 1 cm thick barrier layer 133 of boron carbide powders from Johnson Mathey within a graphite boat 134. Boron carbide will not be infiltrated by this metal composition and procedure. Additional boron carbide was then added to the graphite boat 134 until the surface of the boron carbide bed 133 was approximately level with the upper surface of the matrix metal ingot 131. The setup consisting of the graphite boat 134 and its contents were placed within a conventional controlled atmosphere electric resistance heated vacuum furnace (not illustrated) at room temperature. A vacuum of approximately 5 torr was created within the furnace and maintained as the temperature was raised from room temperature to about 200° C. The furnace and its contents were held at 200° C. for 30 minutes before pure nitrogen gas was backfilled into the furnace to approximately one atmosphere and a continuous flow rate of approximately 21/min. was established. The furnace temperature was then ramped up to about 800° C. over about 2 hours, held at 800° C. for about 10 hours, and ramped down to room temperature in about 2 hours. Upon reaching room temperature, the setup was removed from the furnace and disassembled. A metal matrix composite comprising the $Al_2O_3$ preform infiltrated by aluminum alloy matrix metal was recovered. This Example demonstrates that it is possible to form a macrocomposite comprising a matrix metal different types of fillers such as alumina, AlN and $TiB_2$.

14. The following Example demonstrates the utilization of pressureless infiltration technique to form a macrocomposite body comprising particles with alumina whiskers in the interstices. The method of Example 11 for forming alumina was substantially repeated, except that a preform containing alumina and aluminum powder was used. The preform was formed by slip casting of alumina and aluminum powders into a plaster of paris mold followed by heating the alumina/aluminum preform and plaster mold in an oxidation furnace ramped from room temperature to ~1000° C. in air over a period of 3 hours and maintained at 1000°C. for 2 hours. The aluminum powder was oxidized and transformed into alumina whiskers, which grew in-situ between the particles of the alumina powder. This preform was infiltrated with aluminum alloy matrix metal by the process described in Example 13. The resultant composite contains a higher alumina content from the presence of both the alumina powder and alumina whiskers, for example, 50 v/o or greater. This composite has higher hardness, greater strength and stiffness and greater shear or torsional strength and modulus which is ideally suited for golf club applications.

15. The following Example demonstrates the utilization of a pressureless infiltration method to form a graded ceramic macrocomposite body comprising a relatively hard aluminum nitride rich surface around the composite surface. The method of Example 10 was substantially repeated, except that, rather than using a SiC preform by itself, the SiC preform was sprayed with fine powders of silicon nitride. Under the process conditions, the matrix metal (aluminum) alloy infiltrated the SiC filler material as well as the silicon nitride coating. The reaction between aluminum and silicon nitride results in a hard surface composed of Si and AlN. ($Si_3N_4+4Al=4AlN+3Si$). This reaction provides a very hard composite surface consisting of the AlN ceramic and Si metal alloyed with the aluminum matrix. After reaching room temperature, the setup was removed from the furnace and disassembled. The resultant structure comprised a shaped metal matrix composite body comprising the SiC preform infiltrated with aluminum and the silicon nitride coating infiltrated by the aluminum matrix metal having a surface consisting of primarily AlN with silicon metal and aluminum alloy which possesses very high hardness. This Example demonstrated that through the use of pressureless infiltration, it is possible to create a shaped metal matrix composite body which is composed of a graded composite that has a lower ceramic content interior for increased toughness which is graded to the surface to a much higher ceramic content for a harder more wear resistant surface ideal for golf club applications.

Figure 8:
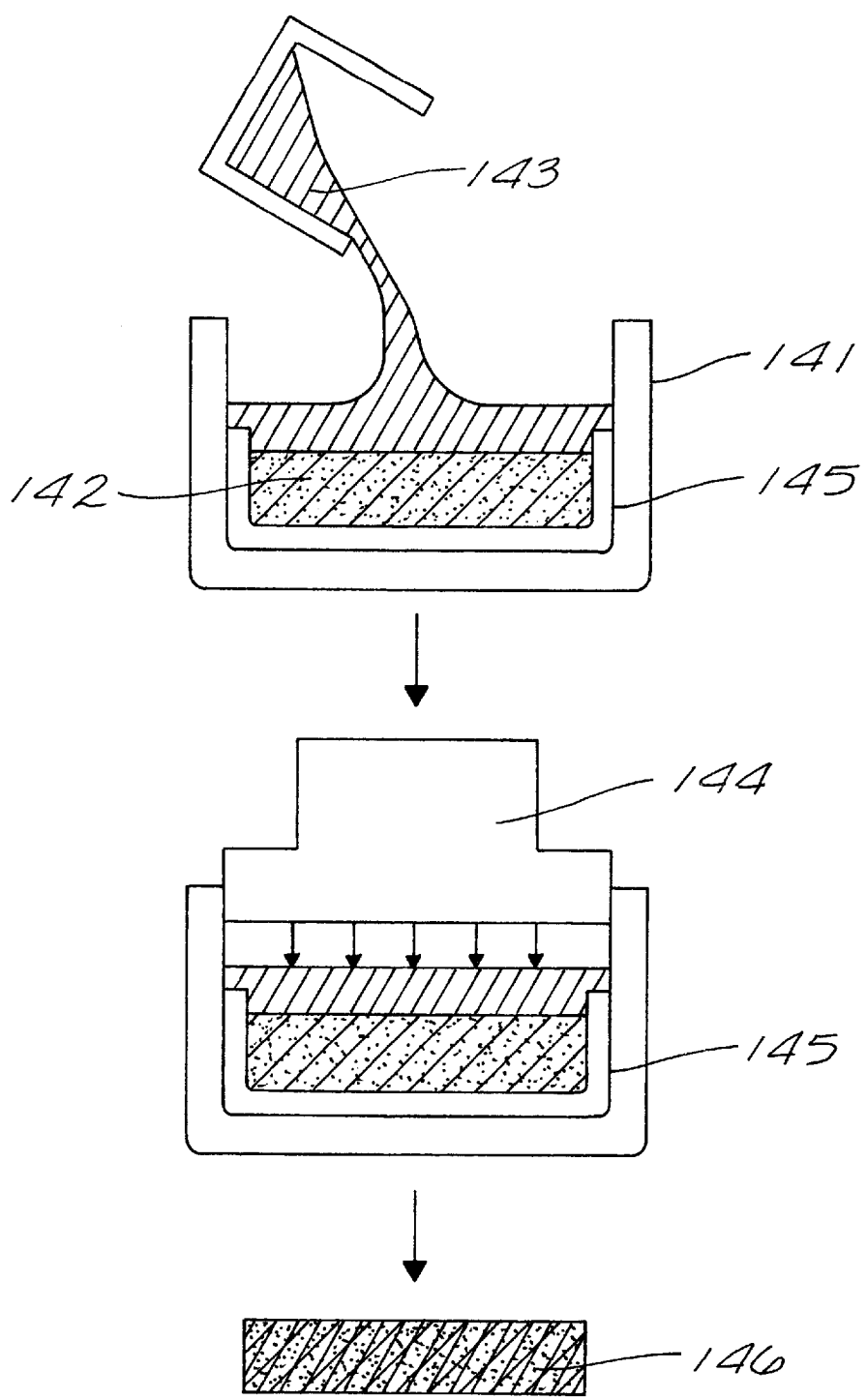
FIG. 8 is a schematic illustration of one form of squeeze casting to form a composite club as described in Example 16.

16. Each of Examples 10 through 15 was repeated, but instead of pressureless infiltration, squeeze casting was utilized to form the aluminum matrix. Squeeze casting was conducted utilizing the processing principals illustrated in FIG. 8. In the case of squeeze casting, as illustrated in FIG. 8, the die mold, 141, which is formed of appropriate material, such as steel, can be in the shape of a club head or shaft containing the preform 142. The die mold 141 is heated to a temperature up to about the melting point of aluminum (660° C.) or the aluminum alloy 143 utilized to form the matrix. The aluminum alloy matrix 143 is heated up to about 50–300° C. above its melting point, termed superheat. The superheated aluminum is poured or injected into the preheated die/mold 141 and pressure is applied with a plunger, ram or piston 144. The pressure causes the superheated aluminum in the die mold 141 to immediately solidify. Pressure up to about 70 MPa is typically used in squeeze casting. Although pressures in the range of 10 to 400 MPa may be used which will depend on the forces necessary to squeeze the aluminum into the preform. As shown in FIG. 8, a porous, ceramic filter may be used as a liner of the die mold 141, if desirable. The time of the squeeze casting is only a few seconds, typically under five seconds and may be as low as one second or under. After the pressure has solidified the superheated molten aluminum 143 forming the matrix of the composite structure 146 it can be immediately ejected from the die/mold. Another preheated preform can then be placed in the die/mold 141 before it looses its desired preheat and the process is repeated, to rapidly produce composite golf club parts/golf clubs. The reinforcement array 142 in the mold 141 can be in the geometry of particles or fibers (solid or hollow) in compositions of metals, ceramics, carbon/graphite or plastic and the casting metal 143 can be magnesium, aluminum, copper, nickel, iron and complex alloys of these.

17. A preform of $TiB_2$ powder, comprised of particles in the 1 to 20 micron size range, was mixed with titanium metal powder and the mixture was die pressed and preheated to 600° C. under inert atmosphere to prevent the titanium powder from oxidizing. Aluminum with a superheat of 200° C., i.e. 200° C. above the melting point of the aluminum, was squeeze cast, which resulted in the titanium powder reacting with the molten aluminum to form a titanium aluminide matrix containing titanium diboride powder.

18. Example 17 was repeated with a mixture of $TiB_2$ powder and titanium metal powder using very small diameter particle size titanium powder in the 1–10 micron size range. Unlike the procedure used in Example 17, the preform was not preheated and was squeeze cast with 250° C.-superheat aluminum to form a titanium aluminide matrix containing titanium diboride powder. It was found by x-ray diffraction that the matrix was TiAl. Thus, the TiAl matrix was formed from small diameter titanium powder without the necessity of preheating or postheating.

19. A preform consisting of SiC particles less than one micron in diameter was suspended in deionized water and pressed in a die/mold which forced the water out, thereby producing a particle compact containing 85% SiC. The SiC preform was then infiltrated by squeeze casting with molten aluminum that produced a composite that could not be scratched by a hardened steel file. Such a composite provides an excellent club or club face insert that retains the groove edge in the face and is not scratched by use, moreover, its hard surface produces higher ball velocity. An entire club or shaft can likewise be produced when using the proper mold design.

20. An SiC preform for a golf club head was produced which was comprised of SiC that was size graded from nanoparticle size SiC on the front surface of the golf club-head to lower volume course grid particles of SiC on the rear club face that does not strike the ball. The overall volume loading of SiC particles comprising the preform was greater than 50%. The gradation preform of SiC was infiltrated with molten aluminum using squeeze casting to produce a casting of a golf club head that consisted of a higher density of nanoparticle sized SiC particles on the club face, with the density of such nanoparticle sized SiC particles gradually reduced at succession distances toward the rear of the club head.

21. Example 20 was repeated with nickel particles mixed with the SiC particles, which produced a nickel aluminide matrix after molten aluminum squeeze casting that featured a golf club head casting with size graded density of SiC nanoparticles as in Example 20, but in a nickel aluminide matrix.

Figure 9:
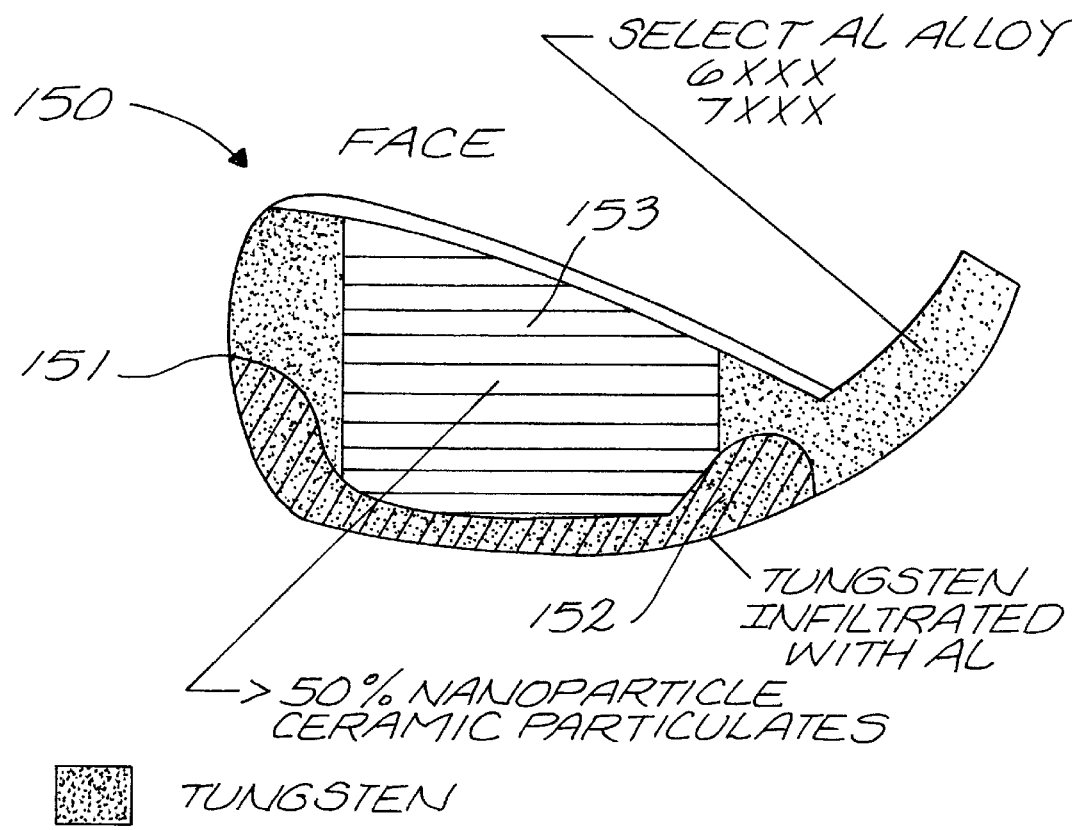
FIG. 9 is a representation of a golf club iron as described in Example 22.
Figure 9:
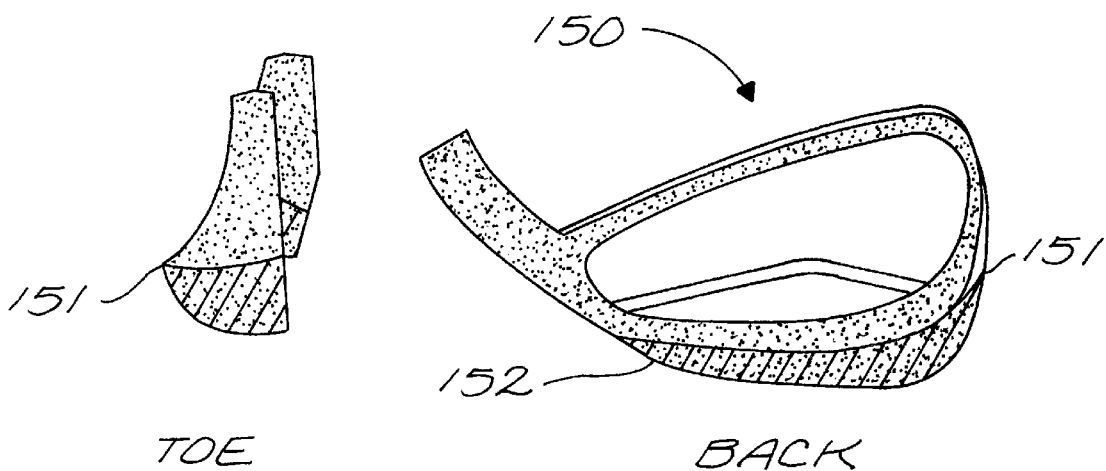

22. Tungsten particles were prepressed in separate dies to form a straight bar in one case, and a curved piece that matched the curve on the bottom toe of a golf club iron 150, as illustrated in FIG. 9. These prepressed tungsten pieces were placed in the toe 151 of a golf club head die/mold to form a preform for a golf club head at the hozel of the die/mold and then SiC particles were placed in the same die/mold with the tungsten preforms. The hybrid particle preform was then squeeze cast with molten aluminum that produced a molded club head 150 with selective weighting in the toe 151 and heel 152 of the composite club that contained the SiC particles in the face 153 and sole of the club 150 as illustrated in FIG. 9.

23. Tungsten powder was placed in a mold in the shape of a golf club head without preforming, but its location was restricted to the toe, sole and heel of the golf club mold. SiC and diamond powder mixture was added to the die and the hybrid powder pressed in the mold to produce a combined loading of greater than 50%. The preformed powder was then squeeze cast with molten aluminum to produce a composite club head that was selectively weighted in the toe, sole and heel to achieve improved golf club performance in addition to producing a hard, composite club head face consisting of both SiC and diamond.

24. Ceramic powder preforms were fixed into a centrifugal casting system that contained a die/mold in the shape of a golf club. The centrifugal casting system was heated to 600° C.

Molten aluminum with a 250° C. superheat was added to the mold which infiltrated the ceramic particle preform. The aluminum remained molten before freezing for a sufficient period that the centrifugal force caused the ceramic particles to migrate to the outer surface of the molten aluminum; thereby providing a higher concentration of particles at and near the surface of the resulting casting. This resulted in gradation of the ceramic particles from the outer surface to the inner surface of the molded club head due to the centrifugal force. The club dies/molds were oriented in respect of the centrifugal forces exerted on the molten aluminum impregnated matrix such that the highest concentration of ceramic particles in the molten aluminum was on the face and sole of the molded club.

25. The methods of the previous Examples were substantially repeated, except that, rather than using a particulate noncontinuous preform, the ceramic particles were sintered, thereby producing a continuous ceramic preform which was used for the infiltration process with the matrix metal. A ceramic preform was produced by pressing 325-mesh alumina. The pressed preform was placed in an oxidation furnace at room temperature and ramped up to ~1200° C. in 3 hours and maintained at 1200° C. for 2 hours and ramped down to room temperature in 3 hours. The alumina preform was partially sintered between the particles, which resulted in a higher green body strength and density. The sintered preform was then placed inside the graphite crucible for infiltration by the matrix metal in an electric resistance vacuum furnace using a procedure identical to that of Example 13. The resulting metal matrix composite was removed from the crucible after infiltration; it was observed that the formed macrocomposite comprised a continuous aluminum alloy metal matrix composite body integrally attached to the excess continuous matrix metal phase. This Example demonstrates that it is possible to form a macrocomposite which comprises a continuous ceramic and continuous metal phase which may be produced by a pressureless process or alternately pressure can be applied such as in the squeeze casting processing.

26. Union carbide HCT-S $TiB_2$ powder was dispersed in an organic solvent, notably toluene, to a solids content of 80% with an adjusted viscosity of 50 cps. A binder, namely, B-76 from Monsanto, was mixed with a plasticizer, namely S160 from Monsanto, in a 1:1 ratio and added to the suspension to an 8% concentration. The viscosity was adjusted at 500 cps and the mixture deaerated by vacuum to remove any trapped gases. The slurry was cast into a desired mold having a golf club head shape and air dried until a strong flexible green body was obtained. Typically, drying time is 1–24 hours depending on the cross section that was cast. The green body had approximately 60–65% solids content. The club head shaped green body was delubed (binder/plasticizer removed) by heating, slowly increasing temperature at a rate of about 2° C./min. with holding of 1 hour at 200° C. and 550° C. After delubing the heating rate of 2° C./hour was continued until 1750° C. and held at that temperature for 2 hours. The sintered $TiB_2$ club head shaped body was cooled to room temperature at a rate of approximately 2° C./min. The density of the sintered body is approximately 80–85% of theoretical. After sintering the $TiB_2$ body was ultrasonicated to remove any unsintered particles within the body. The porous sintered $TiB_2$ body was then subjected to pressureless molten metal infiltration like that used in Examples 10–15, except that the sintered $TiB_2$ body was placed in a graphite crucible coated with boron nitride and the necessary volume of stainless steel or other alloy was placed on top of the porous sintered $TiB_2$, and stainless steel. The graphite crucible with the sintered club head shaped body was then placed in an electric resistance heated vacuum furnace. In the case of stainless steel, the crucible was heated in a non-oxidizing atmosphere to 1450° C. and held for one hour then cooled to room temperature. The resultant golf club head composite is a continuous phase of $TiB_2$ at 80–85% density and a continuous phase of stainless steel at 20–15% density and a void content of less than 1%. The density of the composite is 5.05 g/cc, the hardness of the composite is 2200 Knoop, a strength of one GPa and a fracture toughness of 22 $Mpam^{1/2}$. This is an excellent composite for a golf club.

27. Example 26 was repeated, except that the presintered $TiB_2$ body was squeeze cast infiltrated with molten aluminum similar to Examples 16–23.

28. A mixture of hollow glass fibers, steel capillary tubing and graphite fibers were bundled and formed into a tubular shape and squeeze cast with molten aluminum to form the matrix of the hybrid reinforcement composite. This hybrid composite tube was found to be an excellent lightweight golf club shaft.

29. Hercules IM9 graphite fiber, 6000 fiber tow, was subjected to a SiO and carbon atmosphere at 1500° C., as described in the U.S. patent application Ser. Nos. 60/050715 and 09/007573 to grow SiC whiskers from the surface of the graphite fiber. The whiskerized surface of the graphite fibers are illustrated in FIG. 7. The whiskerized graphite fiber was laid up into two golf club shaft configurations and positioned in respective molds. One was impregnated with epoxy and the other with molten aluminum by squeeze casting in molds configured to produce two golf club shafts. The shear strength of the epoxy composite golf club shaft was determined to be 3,000 psi and that of the aluminum matrix composite golf club shaft was 18,000 psi.

30. A woven cloth of graphite T-300 from Amoco, Inc. was impregnated with thermoset phenolic resin in a pressure mold, the shape of a golf club head, known in the art for producing carbon-carbon composites. The schedule used in this Example was to flash-heat the mold to 165° C., place the graphite cloth in the mold and impregnate the cloth with the phenolic resin, then hold that temperature for 20 minutes. This thermal treatment in the mold hardened the thermoset phenolic, of the golf club head structure, which was removed from the mold and placed in a controlled atmosphere furnace. The resin impregnated graphite cloth molded structure was then pyrolyzed by subjecting it to heat in a non-oxidizing atmosphere. In particular, the temperature was then raised to 1800° C. in two hours and held at 1800° C. for one hour and then cooled to room temperature under no particular cooling schedule. The resultant molded golf club head comprised a composite that was a carbon matrix with graphite fibers. The density of the pyrolyzed carbon matrix golf club structure can be increased (filling of voids left from the pyrolysis of the phenolic) by reimpregnation with the resin followed by further pyrolysis. Typically, the first impregnation and pyrolysis will produce a composite density of about 1.0–1.4 g/cc and 3–4 impregnations with pyrolysis following each one will increase the density to about 1.6–1.7 g/cc. The pyrolysis temperature need not be 1800° C. Any temperature above about 850° C. will provide complete pyrolysis of the phenolic matrix precursor or pitch and the higher the temperature of pyrolysis, the nearer to graphitization occurs which will provide a softer carbon matrix. After the first pyrolysis of the composite golf club head produced in this Example, the density was determined to be 1.1 g/cc. Another such composite was also formed by the same process in the shape of a golf club shaft, which was reimpregnated with epoxy resin and cured following the impregnation of the graphite cloth with phenolic resin and heat treatment described above. The cured shaft was lightweight and the carbon in the matrix provided energy absorption not achieved with graphite fiber-epoxy composites used in golf club shafts. Another such composite made of graphite cloth, impregnated with phenolic resin and subjected to heat treatment as described above was also formed in the shape of a golf club shaft which was then reimpregnated with molten aluminum metal using squeeze casting. The golf club shaft comprised of the hybrid composite of carbon-carbon with an aluminum matrix also provided substantial energy absorption over golf club shafts comprised of all metal or graphite fiber-epoxy composites.

31. Example 31 was repeated to produce a custom golf club head using four successive phenolic resin impregnations each followed by pyrolysis, except that in the second phenolic impregnation the phenolic contained 25-volume percent submicron particle size silicon powder. During the pyrolysis step, the silicon reacted with the carbon graphite to produce SiC. During the third impregnation step the phenolic contained 50 v/o submicron particle size silicon powder which produced a greater amount of SiC during the pyrolysis step. A final and fourth phenolic impregnation which contained sufficient submicron silicon particle size to produce 100% SiC with the available carbon on pyrolysis was conducted and that produced a pure SiC matrix at the surface of the golf club head.

32. This Example was conducted like Example 30, to produce another golf club head, except that after the first pyrolysis of the phenolic in Example 30, the phenolic resin impregnated graphite composite golf club head was removed from the mold and placed in a non-oxidizing furnace and the temperature was raised to 1900° C. Silicon metal granules were melted at the 1900° C. temperature and the molten silicon infiltrated the porous carbon-carbon composite. Some SiC was formed with some silicon on the surface. This formed a very hard golf club face. This process can be used to form clubface inserts as well as the processes described in the previous examples.

33. A high hardness steel alloy with a hardness of Rc70 in a thickness of 0.125 inches was alternately laid up in layers with a brass alloy in a thickness of 0.080 inch and the adjacent layers were diffusion bonded to one another in a mold/press having the shape of a golf club face and sole. The diffusion bonding was achieved at 900° C. and 2,000 psi for two hours. The laminar lay-up was such that the alternate thickness of the respective layers of the hard steel alloy and soft brass alloy was perpendicular to the face of the golf club head with a steel layer as the sole of the club head. Thus, the outer surfaces of the club face of the club presented alternate strips of the hard steel alloy and the soft brass alloy, of 0.125 inch and 0.080 inch thicknesses, respectively.

34. Example 33 was repeated to form a golf club head except that an aluminum alloy layer was utilized in the place of the brass alloy of Example 33 and in the same thickness as the steel. Diffusion bonding of the laminar lay up was accomplished at 600° C. for two hours at 2,000 psi.

35. Example 34 was repeated to form a golf club head using alternate layers of 0.0625 inch thick aluminum and 0.040 inch thick alumina, which had been tape cast. The diffusion bonding was accomplished at 620° C. and 1,000 psi for three hours.

36. Example 35 was repeated to form a golf club head using alternate layers of 0.040 inch thick alumina and thermoplastic nylon, which bonded together at 100° C. and 600 psi.

37. Example 36 was repeated to form a golf club head using alternate layers of 0.125 inch thick steel and thermoset epoxy, which was pressed together under 100 psi during the epoxy cure cycle.

38. Example 7 was repeated to form a golf club head in which the nylon layer was replaced by a composite formed of nylon with a filler of SiC.

39. High hardness steel layers in a thickness of 0.1875 inches were alternately bonded using epoxy binder with oak wood layers in a thickness of 0.625 inches. The molding pressure was 350 psi during the heat cure cycle of the epoxy. A golf club head was thus formed by this process. The configuration of the club head layers was similar to that described in Example 33, with the relatively hard steel layers and relatively soft oak layers alternately presented to the face of the club head with a steel layer as the sole.

40. A golf club head was formed of alternate layers, essentially as in Example 33, except that composite consisting of 20 v/o SiC in an aluminum matrix in a thickness of 0.0625 inch was laid in a mold in layers alternately with layers of titanium in a thickness of 0.125 inch which had been nitrided to a depth of 20 microns and a layer of beryllium copper in a thickness of 0.03 inches. The respective layers were diffusion bonded at 625° C. for four hours at 3,000 psi. The layers of the club head were oriented as in Examples 34 and 40, except that the sequence of layers presented to the club head face was soft aluminum, hard titanium, soft aluminum, hard beryllium copper, soft aluminum, etc. A hard layer of titanium formed the sole of the golf club head.

41. In a sputter deposition system, a layer of stainless steel alloy was deposited to a thickness of eight microns alternately with layers of titanium carbide having a thickness of 1.5 microns using known in the art deposition processing. The alternate layers were built-up to an aggregate thickness of 625 microns, which was used in sheet form and bonded with a silver braze to the face and sole of an aluminum metal golf club driver head. The layer of stainless steel alloy was bonded against the aluminum face of the metal driver and the outer face of the layered composite sheet comprised a layer of titanium carbide, which thereby became the outward or surface layer of the face and sole of the driver.

42. The multilayer laminate comprised of alternate layers of 8 microns thick stainless steel alloy and 1.5 micron thick titanium carbide, produced as in Example 41 was cut into strips with a diamond saw and the strips were then stacked such that the edge was facing outward and bonded using epoxy bonding layers into the form of a golf club face and sole of a golf club head including a built up edge with a hole to accept the golf club shaft.

43. A graphite fabric was treated to grow whiskers on the individual fiber surfaces and in the interstices of the fabric. The SiC whisker fabric was impregnated with epoxy to produce a thickness of 0.125 inches and layers of the epoxy impregnated fabric were laid alternately with a titanium sheet that was 0.0625 inch in thickness to form a laminated structure that was molded under pressure in a mold having the shape of a golf club driver head to cure the epoxy and bond the alternate layers together. The molded and cured structure resulted in a golf club driver comprised of alternate layers of whiskered graphite fabric and titanium, bonded together with epoxy resin. The alternate layers were positioned such that the club face was comprised of alternate strips of the epoxy impregnated graphite fabric with SiC whiskers and titanium.

44. Layers of low carbon mild steel were laid alternately in a mold with layers of a hardened tool steel which in this case was H13. The mild steel was 1/16 inch thick and the H13 hardened tool steel was 3/16 inch thick. Multilayer composites formed of alternate layers of the mild steel and hardened steel were fabricated without a braz/bonding material, which was accomplished by diffusion bonding the alternate layers together at 1000° C. and 2,000 psi in an inert atmosphere. Similar composites were made using a brazing power at the interface of the respective steel layers to aid in the bonding layer. After diffusion bonding, the composite was machined to form an iron insert configuration and subjected to grit blasting on one side. The soft mild steel was eroded while the hardened steel was substantially unaffected. The mild steel erosion formed the grooves for a golf club face while the hardened steel provided a hard surface substantially free of erosion providing grooves that remained unaffected by use and was suitable for imparting excellent spin to the golf ball. Club faces of the same material experience uneven groove wear and thus reduced performance over time.

45. A buckyball, i.e., fullerenes of mixed molecular weights, primarily $C_{60}$ and $C_{70}$, as produced by the Huffman/Kratschmer process known in the fullerenes art, was evaporated onto a titanium golf club to a thickness of about 2–4 microns. Following the buckyball layer, a similar thickness layer of titanium was evaporated onto the golf club. An electron beam was used to scan the surface and cause reaction between the titanium golf club surface, buckyball layers and titanium layers to form an adherent layer of buckyball titanium carbide on the titanium golf club. This method is also useful to produce a titanium carbide layer on other metal structures or metal coated structures, thereby enhancing their surface hardness.

45. Example 45 was repeated and after the titanium layer had been deposited on the buckyball layer, a thick layer of submicron particle size boron powder was sprayed on as a coating. After the electron beam scan of the thus coated titanium club, to react the coatings and titanium on the golf club surface, the alloy surface contained buckyball carbides of titanium and boron and titanium diboride. These hard coatings formed an excellent wear resistant surface on the golf club and can also be applied to similar surfaces on structures other than golf clubs using the same process.

47. A steel substrate for a golf club head structure was coated by sputtering with a layer of titanium about 3–5 $\mu$ thick. The titanium-coated steel was utilized as a substrate and in an argon plasma, a layer of buckyballs were evaporated on the substrate that formed a hard TiC coating on the steel substrate. This process is also useful to enhance the surface of metal surfaced structures other than golf clubs.

48. Buckyball soot, as produced by the Huffman/Kratchner process, unrefined was mixed with a soft plastic epoxy from United Resin Corporation; (F-82 Resin, 117 hardness, 1:1 wt./ratio) and utilized as an insert in a golf club putter face. Likewise, this method can be used to produce other than golf club structures.

49. A mixture of buckytubes containing single and multi-walled fullerenes with soot that also contained other fullernes was preformed to about 50% and aluminum squeeze cast in a mold forming a golf club head insert with molten aluminum into the preform that produced an insert for use in a golf club iron or wood.

50. A mixture of unrefined fullerenes and petroleum coke was mixed with a polyurethane that was used to form an insert for a putter face.

51. A fullerene mix which contained buckytubes and SiC nanoparticles was preformed in a mold to the shape of a golf club iron, which had tungsten particles that had been prepressed and placed in the toe, sole and hozel of the club iron preform structure and squeeze cast with molten aluminum to form an iron comprising a composite containing all reinforcement types.

52. An intermetallic alloy, namely, Fe-40Al-½Mo; which has a density of 5.9 g/cc and which is 25% lighter than 17-4 pH stainless steel, the usual prior art metallic alloy for golf club "irons," was cast into an "iron" which was 20% larger than a typical stainless iron plus additional weight was put into the sole and toe of the intermetallic casting by loading the sole and toe of the iron with tungsten to improve the accuracy of the iron, and performance even if the golf ball contact with the face of the iron occurs off center. The larger club size and additional selective distribution of weight could be obtained because of the lighter intermetallic alloy compared to the usual stainless steel; yet the intermetallic alloy club maintained the same weight as that of a standard stainless steel club. The typical hardness of a stainless steel club is Rc 50–60 and the hardness of the Fe—Al—Mo was Rc 64.

53. An intermetallic alloy consisting of Ti-25Al-17Nb-3B-0.3Nd which has a density of 4.35 g/cc which is 45% lighter than stainless steel head was cast into a "wood" club or driver that was 33% larger than a typical stainless steel "driver." The hardness of the intermetallic alloy driver was Rc 75. A second casting of this intermetallic alloy was hot extruded into a golf club shaft and utilized in the driver head made of the same intermetallic alloy.

54. An intermetallic alloy consisting of Ti-22Al-27Nb, which has a density of 4.5 g/cc, which is 43% lighter than stainless steel, was cast into an ingot and hot extruded into a tube to serve as a shaft for a golf club "iron" or "wood." This particular alloy had a modulus of 35 million psi, which provides a much higher modulus to density ratio than steels.

55. An SHS reaction was used to produce Ti-24Al-14Nb-0.5Mo-3V metal particles. A solution of buckyballs consisting of fullerenes in an organic solvent, namely toulene, was used to coat the metal particles and the solvent was evaporated leaving about 1% buckyballs. The fullerene coated particles were hot consolidated and forged to produce a golf club head comprised of an alloy which had a density of 4.9 g/cc and a hardness of 2500 Knoop.

56. Tungsten powder was pressed into shapes to fit into the toe, sole and heel of a golf club head. These preformed tungsten powder pieces were placed in a die/mold and the intermetallic alloy of Example 55 was squeeze cast to produce an intermetallic alloy golf club with selectively distributed tungsten weighting.

57. A solid piece of oak wood was heat-treated slowly to 1000° C. in an inert atmosphere. After heat treating the volume charge was approximately 40% which produces a porous carbonaceous char. This heat-treated oak was placed in a steel die that was preheated to 450° C. Aluminum with a superheat of 100° C. (760° F.) was poured into the steel die and a steel ram immediately pressed the aluminum which forced it into the oak preform. After removing from the steel die the oak preform was completely infiltrated with aluminum metal which has a strength of 30,000 psi and a modulus of $5 \times 10^6$ psi compared to the original oak wood of 3200 psi and $0.065 \times 10^6$ psi. This same experiment was repeated with other woods that includes pine, fir, redwood, hickory and balsa wood.

58. A laminated persimmon wood in the form of a golf club wood was pyrolized to 1200° C. in an inert atmosphere. The charred product was then placed in a vacuum chamber containing a suspension of isopropyl alcohol and silicon carbide in the size range of less than 10 microns down to less than one micron in a ratio of 5 to 1 with diamond particles in a size range of approximately 20 microns. The porous charred wood was lowered into the particulate suspension for the face and sole only to be impregnated with the particulate. The isopropyl alcohol was evaporated when the wood preform was placed in a steel die heated to 400° C. Aluminum was squeeze cast onto the preform producing a metal-wood golf club with ceramic particulate in the face and sole. This example was repeated but a portion of the wood sole was removed and a pre-pressed piece of tungsten powder was inserted. Tungsten particles were impregnated in the remainder of the sole and clubface instead of the SiC particles. Aluminum was squeeze cast into the charred preform to produce a club containing the tungsten weighting of the un-sintered tungsten particles.

59. A piece of pine board that is referred to as one by four was heat-treated to 1800° C. in an inert atmosphere. The charred preform was placed in a steel die and aluminum squeeze cast therein. The finished composite could be sawed like normal wood and could be nailed or screwed like normal wood. However it was not flammable when placed in a gas flame and could be expected to not be attacked by termites or other normal wood degradation processes. The strength and stiffness was over ten times that of the original wood. Such a composite is an excellent structural member.

60. A block of particle laminated wood was carved into an architecture representing a starfish and charred to 800° C. The char preform was placed in a mold and bronze was squeeze cast to fill the porous char.

61. A paper preform was made by laminated object modeling rapid prototype preforming. This preform was pyrolyzed in an inert atmosphere to 625° C. The char preform was then placed in a steel die and infiltrated with aluminum by squeeze casting.

62. Rice paper was shredded and soaked in water with a wetting agent and water-soluble glue. The liquid was filtered and the remaining softened paper shred was placed in a mold that formed a piston for an internal combustion engine. The mold was heated to 200° C. under a pressure of 1000 psi. The molded piston was then heat-treated to 870° C. in an inert atmosphere. The charred piston was then placed in a steel die and magnesium was squeeze cast to produce a carbon fibrous reinforced magnesium piston.

63. A hickory wood was heat-treated to 1400° C. in an inert atmosphere. The porous charred preform was then vacuum impregnated with the preceramic polymer ceraset from DuPont. The preceramic polymer impregnated preform was then heat-treated to 1400° C., which produced a ceramic matrix of silicon carbide. Two additional reimpregnation steps with 1400° C. pyrolysis was conducted that resulted in a carbon fibrous reinforced silicon carbide matrix composite. This example was repeated except an alumina sol-gel was used to form the matrix instead of the preceramic polymer ceraset. The example was repeated except the matrix was formed by the chemical vapor infiltration known in the art to deposit a silicon carbide matrix using methyltrichlorosilane.

64. Example 63 was repeated to form the porous char. The carbon char was then subjected to chemical vapor reaction processing as described in U.S. patent application Ser. No. 09/007,573 "Carbon Composites" (filing date Jan. 15, 1998) that converted the carbon char to silicon carbide. The silicon carbide fibrous preform was then vacuum impregnated with ceraset and pyrolyzed to produce a silicon carbide matrix. This processing resulted in a silicon carbide/silicon carbide composite.

65. Example 62 was repeated to form the filtered softened paper shred. In this case a layer of carbon fabric in a square weave was laid alternately on layers of the soft paper shred. This layered preform was then laid into a square die and pressed at 1000 psi while heating to 200° C. The cured pressed preform was then heated to 1000° C. in the absence of air which produced a carbonaceous preform consisting of alternate layers of carbon fabric and fibrous materials from the paper char. This preform was then infiltrated with aluminum by squeeze casting. The Example was repeated except the aluminum infiltrant was replaced with the thermoplastic nylon. The Example was repeated except that thermoset phenolic resin was infiltrated instead of nylon and heated to 165° C. to cure the resin. The Example was repeated except a catalyzed cured epoxy resin was infiltrated into the charred preform which the resin cured in one hour. This Example was repeated except instead of using carbon fabric, chopped and milled carbon fiber was mixed with the softened paper shred and fully mixed. After molding and pyrolyzing to produce a char which now contains random discontinuous carbon fiber, the preform was infiltrated with molten magnesium by squeeze casting.

66. Cotton staple was mixed in water with a wetting agent and water soluble glue. The slurry was molded to the shape of a rectangle two inches by four inches by ¼ inch thick at a pressure of 1,000 psi while heating to 250° C. After removing from the mold, the formed piece was subjected to pyrolysis in absence of air to 870° C. that produced a carbonaceous char in fibrous form. The porous char was placed in a mold and squeeze cast infiltrated with molten aluminum. The composite was then utilized as a putter face of a golf club. Such a reinforced composite is also applicable to many other component uses including structural. The Example was repeated and a mixture of small particle silicon carbide and diamond was infiltrated into the char followed by infiltration with aluminum using squeeze casting. This provided a very hard surface suitable for an insert to a golf club iron or wood. The example was repeated and the char subjected to chemical conversion to silicon carbide as described in Example 64. The SiC preform was then infiltrated with aluminum by squeeze casting. This Example was repeated except wool staple was used instead of cotton.

What is claimed is as follows:

1. The method of making a golf club structure that comprises preparing a preform array comprising a ceramic fiber, placing said preform in a mold configured to form a golf club structure, and squeeze casting said preform with molten superheated aluminum to cause full penetration of said molten aluminum into said preform and form a fiber reinforced metal composite golf club structure.

2. The method of claim 1 wherein the preform array includes PBO fiber in a mixture with said ceramic fiber.

3. The method of claim 1 wherein the ceramic fiber preform is impregnated with titanium powder particles prior to the squeeze casting step.

4. The method of claim 3 wherein the ceramic fiber comprises silicon carbide, whereby the resulting squeeze cast golf club structure is formed of a composite comprising a silicon carbide fiber reinforced titanium aluminide matrix.

5. The method of claim 3 wherein the preform is impregnated with titanium by vacuum impregnation of the fiber preform with a slurry of titanium powder in an alcohol solvent, followed by evaporation of the solvent.

6. The method of making a golf club structure that comprises placing a relatively porous preform in a squeeze casting die configured to form the golf club structure, subjecting the mold to heat to bring it to a temperature above room temperature but no higher than the melting point temperature of a selected matrix metal to be introduced into the mold, subjecting a quantity of the selected matrix metal to sufficient heat to bring its temperature above its melting point to its superheat temperature point, and introducing the superheated matrix metal into the mold under sufficient pressure to cause it to fully penetrate the porous preform and to rapidly solidify.

7. The method of claim 6 wherein the preform is comprised essentially of one or more of metal, ceramic, carbon or plastic.

8. The method of claim 6 wherein the matrix metal is comprised of one or more of magnesium, aluminum, copper, nickel or iron metal or a complex alloy of one or more of these metals.

9. The method of claim 1 wherein the ceramic fiber of the preform array is $TiB_2$ powder, wherein the $TiB_2$ powder is mixed with titanium metal powder, wherein the mixture of the $TiB_2$ powder is die pressed and pre heated to about 600° C. in an inert non-oxidizing atmosphere prior to the step of squeeze casting the preform with molten superheated aluminum to cause the titanium powder to react with the molten aluminum to form a titanium aluminide matrix containing titanium boride powder, said matrix being molded to form the golf club structure.

10. The method of claims 1 wherein the ceramic fiber of the preform array is $TiB_2$ powder, wherein the $TiB_2$ powder is mixed with titanium metal powder comprised of metal particles in the 1–10 micron size range, wherein the squeeze casting step is carried out, without preheating, using molten superheated aluminum to form a titanium aluminide matrix golf club structure containing titanium diboride powder.

11. The method of claim 1 wherein the ceramic fiber of the preform is SiC powder comprised of particles of less than one micron in diameter suspended in deionized water and pressed in a die mold configured to form the golf club structure in order to force out the water from the resulting preform which is then subjected to the squeeze casting step using molten superheated aluminum.

12. The method of claim 1 wherein the ceramic fiber of the preform is SiC powder comprised of particles size graded from nanoparticle size to course grid particle size, wherein the golf club structure is a golf club head having a front surface defining the striking areas and a rear surface that does not strike the ball, wherein the ceramic particles are dispersed in the preform in a size graduated manner with a higher density of the smaller particles toward the front surface and lower density of smaller particles toward the rear surface and, conversely, with a higher density of the larger particles toward the rear surface and lower density of the larger particles toward the front surface, whereby the squeeze casting step results in an aluminum metal matrix golf club head structure having a higher density of smaller diameter SiC particles dispersed toward the front striking surface and a higher density of larger diameter SiC particles dispersed toward the rear non striking surface.

13. The method of claim 12 wherein powdered nickel particles are mixed with the size graded SiC powder particles forming the preform, whereby the molten aluminum squeeze casting step results in the production of a nickel aluminide matrix golf club head with the size graded SiC particles dispersed therein.

14. The method of making a golf club structure that comprises preparing a component preform of such structure by pressing a quantity of tungsten metal particles in a first die mold configured to form a preform of such component, placing said preform in a selected region of a second die mold configured to form the golf club structure together with a quantity of ceramic particles that are less dense than the tungsten particles to form a hybrid preform in said second die mold comprising the tungsten component preform and the ceramic particles and squeeze casting said hybrid preforms in the second die mold with a molten superheated metal matrix material to produce a composite molded golf club structure that is selectively weighted as determined by the placement of the tungsten component preform in the mold employed to form said golf club structure.

15. The method of claim 14 herein the second die mold is configured to form a golf club head structure, the component preform is configured by the first mold to conform to a selected region of the second die mold where it is desired to provide greater weight in the corresponding region of the molded golf club head.

16. The method of claim 14 wherein the ceramic particles are comprised essentially of SiC.

17. The method of claim 15 wherein the ceramic particles are comprised essentially of SiC.

18. The method of claim 15 wherein the tungsten metal component preform is configured to conform to the toe and head region of the molded golf club head and is placed in the corresponding region of the second mold.

19. The method of claim 17 wherein the tungsten metal component preform is configured to conform to the toe and head region of the molded golf club head and is placed in the corresponding region of the second mold.

20. The method of claim 19 wherein a second component preform corresponding to a second selected region of the second mold is prepared by pressing another quantity of tungsten metal particles in a mold configured to form such second component preform, and wherein the second component preform is placed in the second selected region of the second mold prior to the squeeze casting step.

21. The method of making a golf club head structure that comprises: selectively placing quantities of tungsten metal powder in each of the toe, sole and heel regions of a mold configured to form a golf club head, placing a powder mixture of ceramic SiC particles and diamond particles in the remaining space of said mold, pressing the contents of the mold to produce a combined loading of greater than 50% by volume, thereby producing a hybrid powder preform of the golf club head, squeeze casting the hybrid powder preform with molten superheated aluminum to produce a composite club head that is selectively weighted in the toe, sole and heel and having a hard club head face comprised of both SiC and diamond.

22. A method of making a golf club structure that comprises: forming a relatively porous ceramic preform shaped to form the golf club structure, said ceramic preform being formed essentially of $TiB_2$ powder that is incorporated in a slurry and cast in a mold configured to form the golf club structure and dried to produce a green body structure that is subjected to heat under appropriate temperatures and atmosphere conditions to sinter the green body structure and produce a porous sintered $TiB_2$ body having the desired golf club structure shape, subjecting the porous sintered $TiB_2$ structure to infiltration with matrix metal by a squeeze casting process using molten superheated matrix metal to produce the final golf club structure formed of a composite comprising a continuous phase of $TiB_2$ and a continuous phase of matrix metal.

23. The method of claim 22 wherein the ceramic preform is prepared by dispersing the $TiB_2$ powder in an organic solvent, mixing a binder with a plasticizer and adding this mixture to the $TiB_2$ dispersion to form the slurry that is cast in the mold to form the green body structure that is used to produce the porous sintered $TiB_2$ body.

24. The method of claim 22 wherein the matrix metal is a stainless steel alloy.

25. The method of claim 22 wherein the matrix metal is comprised primarily of aluminum.

26. The method of claim 22 wherein the golf club structure is a club head.

27. The method of claim 24 wherein the golf club structure is a club head.

28. The method of claim 25 wherein the golf club structure is a club head.

29. The method of making a golf club structure comprising a club shaft that comprises: assembling a bundle of hollow glass fiber, steel capillary tubes and graphite fibers, squeeze casting the bundle with molten superheated aluminum in a mold configured to form the golf club structure to produce a hybrid composite tube configured as a golf club shaft.

30. The method of making a golf club structure that comprises laying up a quantity of whiskerized graphite fibers to provide a preform in a mold configured to form the golf club structure, infiltrating the whiskerized graphite fibers with matrix metal by squeeze casting with molten superheated aluminum in the mold to cause full penetration of said molten aluminum into said preform and produce aluminum matrix composite golf club structure.

31. The method of claim 30 wherein the mold is configured to produce a golf shaft structure.

32. The method of making a golf club structure that comprises: preparing a preform comprising a mixture of buckytubes containing single and multiwalled fullerenes with soot that also contains other fullerenes, placing the preform in a mold configured to form the golf club structure, and introducing molten superheated aluminum into the mold with the preform and squeeze casting the contents of the mold to produce a composite golf club structure.

33. A golf club structure produced by the method of claim 14.

34. A golf club structure as defined in claim 33 wherein the golf club structure comprises: a composite formed of tungsten metal particles and a ceramic phase in a metal matrix comprised primarily of aluminum.

35. A golf club structure as defined in claim 34 wherein the ceramic phase is comprised essentially of SiC.

36. A golf club structure produced by the method of claim 21.

37. A golf club structure formed by the method of claim 22.

38. A golf club structure as defined in claim 37 wherein the golf club structure comprises: a composite formed of a continuous phase of $TiB_2$ and a continuous phase of metal that is essentially stainless steel alloy.

39. The method of making a composite structure that comprises the steps of: forming a fibrous preform of said structure from a naturally occurring starting product or a product derived therefrom that contains one or more of a cellulose, semi cellulose or lignin and which, upon pyrolization, forms a carbonaceous char, subjecting said fibrous preform to heat under non oxidizing pyrolyzing condition to form a porous char of said preform, and infiltrating said porous char with a matrix metal by a squeeze casting process using molten superheated matrix metal to cause full penetration of said molten matrix metal into said porous char.

40. The method of claim 39 wherein the starting product is wood.

41. The method of claim 40 wherein the starting product is laminated wood.

42. The method of claim 39 wherein the starting product is paper.

43. The method of claim 42 wherein the paper is disposed in layers alternately with layers of carbon fabric and subjected to heat and pressure in a die to form the preform prior to subjecting it to the pyrolysis step.

44. The method of claim 40 wherein the infiltration step comprises infiltration of the porous char by molten superheated aluminum.

45. The method of claim 44 wherein the infiltration is carried out in two steps, first by placing the porous char in a metal die and introducing molten superheated aluminum into the porous char under pressure, then by moving the aluminum impregnated char from the die and further infiltrating it with molten aluminum.

46. The method of claim 40 wherein the infiltration step comprises placing the porous char in a vacuum chamber containing a suspension of isopropyl alcohol and silicon carbide with diamond particles to selectively impregnate a portion of the porous char with said particles, evaporating the isopropyl alcohol and infiltrating the particle impregnated char with molten superheated aluminum by squeeze casting in a heated die mold.

47. The method of claim 46 wherein the composite structure is a golf club, and the portion of the structure impregnated with particles is the face and sole of the club structure.

48. The method of claim 40 wherein the infiltration step comprises infiltration of the porous char by squeeze casting with molten superheated bronze.

49. The med of claim 39 wherein the infiltration step comprises squeeze casting with molten superheated aluminum.

50. The method of claim 42 wherein the infiltration step comprises squeeze casting with molten superheated aluminum.

51. The method of claim 42 wherein the paper starting product is shredded and soaked with water and water-soluable glue and molded under heat and pressure to form a preform in the shape of an engine piston and wherein the pyrolyzed char preform is infiltrated with molten superheated magnesium by squeeze casting to produce a composite carbon fiber reinforced magnesium piston.

52. The method of claim 39 wherein the starting product is comprised of alternate layers of shredded paper and carbon fabric that is cured and die formed under heat and pressure prior to the pyrolysis step and wherein the preformed pyrolyzed char is infiltrated with molten superheated aluminum by squeeze casting.

53. The method of claim 39 wherein the starting product is comprised of softened paper and carbon fibers and wherein the infiltration step involves infiltration with molten superheated magnesium by squeeze casting.

54. The method of claim 39 wherein the starting product is comprised of cotton.

55. The method of claim 39 wherein the starting product is comprised of wool.

56. The method of claim 53 wherein the infiltration step involved infiltration with molten superheated aluminum by squeeze casting.

57. The method of claim 56 wherein the porous char is infiltrated with particles of silicon carbide and diamond prior to the step of infiltrating it with molten superheated aluminum.

58. The method of claim 56 wherein the porous char is converted to silicon carbide by chemical vapor reaction processing prior to the step of infiltrating it with molten superheated aluminum.

* * * * *